US007585222B2

(12) United States Patent
Muir

(10) Patent No.: US 7,585,222 B2
(45) Date of Patent: Sep. 8, 2009

(54) GAMING DEVICE AND METHOD PROVIDING A NEAR MISS INSURANCE POOL OR FUND

(75) Inventor: David H. Muir, Warnesbay (AU)

(73) Assignee: IGT, Reno, NV (US)

( * ) Notice: Subject to any disclaimer, the term of this patent is extended or adjusted under 35 U.S.C. 154(b) by 616 days.

(21) Appl. No.: 11/427,656

(22) Filed: Jun. 29, 2006

(65) Prior Publication Data

US 2007/0060254 A1 Mar. 15, 2007

Related U.S. Application Data

(60) Provisional application No. 60/708,976, filed on Aug. 17, 2005.

(51) Int. Cl.
*G06F 17/00* (2006.01)

(52) U.S. Cl. .......................................................... 463/25

(58) Field of Classification Search .............. 463/16–25
See application file for complete search history.

(56) References Cited

U.S. PATENT DOCUMENTS

| | | | |
|---|---|---|---|
| 1,978,395 A | 10/1934 | Groetchen | |
| 3,420,525 A | 1/1969 | Waders | |
| 3,642,287 A | 2/1972 | Lally et al. | |
| 3,735,987 A | 5/1973 | Ohki | |
| 4,326,351 A | 4/1982 | Heywood et al. | |
| 4,410,178 A | 10/1983 | Partridge | |
| 4,440,451 A * | 4/1984 | Goodell et al. | 301/105.1 |
| 4,448,419 A | 5/1984 | Telnaes | |
| 4,517,558 A * | 5/1985 | Davids | 345/629 |
| 4,756,531 A | 7/1988 | DiRe et al. | |
| 4,826,169 A | 5/1989 | Bessho et al. | |
| 4,836,546 A | 6/1989 | DiRe et al. | |
| 5,046,736 A * | 9/1991 | Bridgeman et al. | 463/13 |
| 5,152,529 A | 10/1992 | Okada | |
| 5,178,390 A | 1/1993 | Okada | |
| 5,259,616 A | 11/1993 | Bergmann | |
| 5,342,049 A | 8/1994 | Wichinsky et al. | |
| 5,364,100 A | 11/1994 | Ludlow et al. | |
| 5,393,057 A | 2/1995 | Marnell, II | |

(Continued)

FOREIGN PATENT DOCUMENTS

AU 199716432 B2 9/1997

(Continued)

OTHER PUBLICATIONS

Arcade History website, http://www.arcade-history.com/history_database.php..., 2000-2006.

(Continued)

*Primary Examiner*—Ronald Laneau
(74) *Attorney, Agent, or Firm*—K&L Gates LLP

(57) ABSTRACT

A gaming device having a game that includes several nearly missed outcomes associated with a designated outcome, where the player is provided an award for achieving a nearly missed outcome. If the player obtains the nearly missed outcome, the award is provided from a near miss insurance pool. Therefore, when a player nearly misses achieving a large jackpot, the gaming device provides the player with insurance payoff. In general, the near miss insurance pool is funded from a portion of each wager, and may be funded by several linked gaming devices.

78 Claims, 15 Drawing Sheets

U.S. PATENT DOCUMENTS

| | | | | |
|---|---|---|---|---|
| 5,393,061 | A | 2/1995 | Manship et al. | |
| 5,395,111 | A | 3/1995 | Inoue | |
| 5,524,888 | A | 6/1996 | Heidel | |
| 5,584,764 | A | 12/1996 | Inoue | |
| 5,647,798 | A | 7/1997 | Falciglia | |
| 5,664,998 | A * | 9/1997 | Seelig et al. | 463/20 |
| 5,697,843 | A * | 12/1997 | Manship et al. | 463/20 |
| 5,704,835 | A | 1/1998 | Dietz, II | |
| 5,727,786 | A | 3/1998 | Weingardt | |
| 5,752,881 | A | 5/1998 | Inoue | |
| 5,775,692 | A | 7/1998 | Watts et al. | |
| 5,851,148 | A | 12/1998 | Brune et al. | |
| 5,882,261 | A | 3/1999 | Adams | |
| 5,919,088 | A | 7/1999 | Weiss | |
| 5,935,002 | A | 8/1999 | Falciglia | |
| 5,954,335 | A | 9/1999 | Moody | |
| 5,984,782 | A | 11/1999 | Inoue | |
| 6,003,867 | A | 12/1999 | Rodesch et al. | |
| 6,033,307 | A | 3/2000 | Vancura | |
| 6,059,289 | A | 5/2000 | Vancura | |
| 6,062,980 | A | 5/2000 | Luciano | |
| 6,086,066 | A | 7/2000 | Takeuchi et al. | |
| 6,089,976 | A | 7/2000 | Schneider et al. | |
| 6,093,102 | A | 7/2000 | Bennett | |
| 6,102,400 | A | 8/2000 | Scott et al. | |
| 6,102,798 | A | 8/2000 | Bennett | |
| 6,117,009 | A * | 9/2000 | Yoseloff | 463/20 |
| 6,135,722 | A * | 10/2000 | Kawaguchi et al. | 417/222.2 |
| 6,206,782 | B1 * | 3/2001 | Walker et al. | 463/25 |
| 6,210,279 | B1 | 4/2001 | Dickinson | |
| 6,213,876 | B1 | 4/2001 | Moore, Jr. | |
| 6,217,448 | B1 * | 4/2001 | Olsen | 463/25 |
| 6,224,483 | B1 | 5/2001 | Mayeroff | |
| 6,270,412 | B1 | 8/2001 | Crawford et al. | |
| 6,302,790 | B1 | 10/2001 | Brossard | |
| 6,315,663 | B1 | 11/2001 | Sakamoto | |
| 6,319,124 | B1 | 11/2001 | Baerlocher et al. | |
| 6,328,649 | B1 | 12/2001 | Randall et al. | |
| 6,347,996 | B1 | 2/2002 | Gilmore et al. | |
| 6,398,218 | B1 | 6/2002 | Vancura | |
| 6,398,220 | B1 | 6/2002 | Inoue | |
| 6,435,511 | B1 | 8/2002 | Vancura et al. | |
| 6,439,995 | B1 | 8/2002 | Hughs-Baird et al. | |
| 6,461,241 | B1 | 10/2002 | Webb et al. | |
| 6,471,208 | B2 | 10/2002 | Yoseloff et al. | |
| 6,537,150 | B1 | 3/2003 | Luciano et al. | |
| 6,537,152 | B2 * | 3/2003 | Seelig et al. | 463/30 |
| 6,569,015 | B1 | 5/2003 | Baerlocher et al. | |
| 6,575,830 | B2 | 6/2003 | Baerlocher et al. | |
| 6,585,588 | B2 | 7/2003 | Hartl | |
| 6,589,114 | B2 | 7/2003 | Rose | |
| 6,595,854 | B2 | 7/2003 | Hughs-Baird et al. | |
| 6,659,864 | B2 | 12/2003 | McGahn et al. | |
| 6,676,512 | B2 | 1/2004 | Fong et al. | |
| 6,679,497 | B2 | 1/2004 | Walker et al. | |
| 6,726,204 | B2 | 4/2004 | Inoue | |
| D504,473 | S | 4/2005 | Baerlocher | |
| 6,875,106 | B2 | 4/2005 | Weiss et al. | |
| 6,960,134 | B2 * | 11/2005 | Hartl et al. | 463/20 |
| 7,004,836 | B2 * | 2/2006 | Kaminkow et al. | 463/20 |
| 7,007,953 | B1 | 3/2006 | Cabot | |
| 7,329,182 | B2 | 2/2008 | Adams et al. | |
| 2003/0008698 | A1 | 1/2003 | Stone | |
| 2003/0040355 | A1 | 2/2003 | Baerlocher | |
| 2003/0216165 | A1 | 11/2003 | Singer et al. | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0048644 | A1 | 3/2004 | Gerrard et al. | |
| 2004/0106449 | A1 | 6/2004 | Walker et al. | |
| 2005/0101376 | A1 | 5/2005 | Walker et al. | |
| 2005/0277460 | A1 | 12/2005 | Inoue | |

FOREIGN PATENT DOCUMENTS

| | | | |
|---|---|---|---|
| AU | A-50327/96 | | 10/1997 |
| AU | 2004222759 | | 5/2006 |
| DE | 3 105 266 | A1 | 9/1982 |
| EP | 0 798 676 | A1 | 10/1997 |
| EP | 0 926 645 | A2 | 6/1999 |
| EP | 0 944 030 | A2 | 9/1999 |
| EP | 0 945 837 | A2 | 9/1999 |
| EP | 1 184 822 | | 3/2002 |
| GB | 1 464 896 | A | 2/1977 |
| GB | 2 106 292 | A | 8/1981 |
| GB | 2 083 936 | A | 3/1982 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 161 008 | A | 1/1986 |
| GB | 2 170 636 | A | 8/1986 |
| GB | 2 170 643 | A | 8/1986 |
| GB | 2 180 087 | A | 3/1987 |
| GB | 2 181 589 | A | 4/1987 |
| GB | 2 183 882 | A | 6/1987 |
| GB | 2 191 030 | A | 12/1987 |
| GB | DE 3 700 861 | A1 | 7/1988 |
| GB | 2 222 712 | A | 3/1990 |
| GB | 2 225 889 | A | 6/1990 |
| GB | 2 226 436 | A | 6/1990 |
| GB | 2 242 300 | A | 9/1991 |
| GB | 2 262 642 | A | 6/1993 |
| GB | 2 328 311 | A | 2/1999 |
| GB | 2 335 524 | | 9/1999 |
| WO | WO0032286 | | 6/2000 |
| WO | WO 00/59591 | | 10/2000 |

OTHER PUBLICATIONS

Aztec Temple MultiWay Article by Strictly Slots, published Aug. 2005.
Barn Yard Article in Strictly Slots, published in Mar. 2002.
Bonus Times Article written by Strictly Slots, published in Jul. 2000.
Easy Street Advertisements and Articles written by Casino Data Systems, published in 2000.
Gold Fever Advertisement written by Atronic Casino Technology, Ltd., published 1999.
Gold Fever Atronic Web Page written by Atronic Casino Technology, Ltd., dated Mar. 2002.
Jewel in the Crown Advertisement written by Barcrest Ltd., published 1999.
Marshall Fey, Slot Machines, a pictorial History of the First 100 Years, 1983, Liberty Belle Books, pp. 79, 150, 171, 231.
On the Money Advertisement written by Strictly Slots, published in Dec. 2000.
Take Your Pick Advertisement written by IGT/Anchor Gaming, published in 1999, on or before December thereof.
Take Your Pick Article, Strictly Slots, published Mar. 2001.
Vision Series™/Good Times™ Brochure written by IGT, published in 1999, on or before December thereof.
X Factor Brochure and Website Page written by WMG Gaming, Inc., published in 1998, on or before December thereof.

* cited by examiner

GAMING DEVICE AND METHOD PROVIDING A NEAR MISS INSURANCE POOL OR FUND

PRIORITY CLAIM

This application is a non-provisional application of, claims priority to and the benefit of U.S. Provisional Patent Application Ser. No. 60/708,976, filed on Aug. 17, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Players are generally excited when they win and disappointed when they lose. Excitement is generally enhanced when the player wins by a narrow margin. For example, in a multiplayer poker game, a player can be very excited if their hand of four Aces beat a second player's hand of four Kings. Similarly, the player who had the hand of four Kings can be quite disappointed.

Many contemporary gaming devices such as slot machines randomly generate awards and other outcomes where a player can miss achieving a large award by a seemingly very narrow margin. Such gaming devices typically include a relatively low probability of obtaining the highest award, relatively medium probabilities of obtaining medium range awards and relatively higher probabilities of obtaining low range awards. These gaming devices also include probabilities of obtaining losses or no award at all. The awards and probabilities of obtaining the awards and the amount of the awards are used to calculate the average expected pay out percentage or paytable of these wagering gaming devices.

In certain wagering games where the probability of obtaining the highest award is relatively low, players can become particularly frustrated after seemingly nearly missing a large jackpot prize. For example, the probability of obtaining the highest award in a wide area progressive game may be one-in-thirty-million where the award is $1,000,000 or more. In this situation, achieving a near miss combination such as missing the highest award by one symbol or symbol position could be very disappointing to a player because the outcome seems so close to the outcome for achieving such a large award. The player may also be frustrated because the player may believe that the event is unlikely to repeat itself. In general, a near miss outcome can be in many different forms such as by not achieving a winning combination, by missing one symbol or symbol position, having a symbol out of position, missing by one card, or missing by one number, etc.

In one example, a gaming device includes a traditional reel slot game having a designated number of reels, and a plurality of symbols on each reel. In operation, upon a wager by a player, the gaming device causes the reels to spin. The reels stop spinning to indicate a winning or losing combination of the symbols on the reels. In one example of a near miss, a gold bar is generated on a payline for each of the first two reels, but the gold bar is generated just above the payline for the third reel. In this example, the player missed achieving the highest award because the third and final symbol required for the jackpot award (i.e., the award associated with three adjacent gold bar symbols generated on the same payline) occurred from the player's perspective only one physical reel stop position away from the payline. It should be appreciated that, the calculation for the final position of the symbols can be calculated in any suitable manner such as described in U.S. Pat. No. 4,448,419 to Telnaes.

Several games have been developed that allow displayed symbols to change position to change a near miss outcome into a winning outcome. These methods are capable of producing more winning combinations for the player. For example, certain slot games have nudge symbols that have an indicator (such as an arrow) pointing up or down. When a nudge symbol pointing down occurs above the payline, the reel rotates and the symbol automatically moves down. When a nudge symbol pointing up occurs below the payline, the reel rotates and the symbol automatically moves up. The nudge symbols do not discriminate between a near miss combination of symbols and any other combination of symbols. A nudge symbol thus changes the position of the symbol regardless of whether or not it results in a winning combination of symbols. Therefore, the nudge symbol may change a losing symbol combination of symbols into a winning symbol combination, but it does not guarantee a win because it may change a losing symbol combination into another losing symbol combination. Typically, nudge symbols have not been used for winning the largest top award or jackpot. Moreover, if a nudge symbol is provided for a large award, the large award can occur much more frequently and this can change the paytable dramatically, which is generally undesirable.

A need therefore exists to provide a gaming device and method which addresses the situation where a player achieves a near miss of a large award such as a jackpot.

SUMMARY

The present disclosure relates in general to a gaming device and method and more particularly, to a gaming device and method having or associated with a near miss insurance pool or fund. In one embodiment, if the player obtains a designated nearly missed outcome, such as missing a royal straight flush in a poker game by one card or a top award in a slot game, the gaming device provides the player a designated near miss award. In another embodiment, if the player obtains a designated nearly missed outcome, the gaming device provides the player one or more award opportunities to obtain a designated near miss award or the award nearly missed. The award or award opportunity functions to lessen the effect on the player which may occur following the player nearly missing the top award or other designated award. The near miss award such as a designated award or any awards obtained through the award opportunity are funded by the near miss insurance pool or fund which in one embodiment is maintained independent from the paytable of the gaming device.

In one embodiment, the gaming device provides a game which includes a plurality of different outcomes. The outcomes generally include a plurality of winning outcomes including at least one designated outcome and a plurality of losing outcomes. For example, the designated outcome includes the combination of symbols associated with or which results in the highest award. The game also includes at least one or a plurality of near miss outcomes. A near miss outcome includes an outcome that is similar to the corresponding designated outcome, but differs slightly in at least one respect. In one embodiment, the designated outcome is a predefined symbol combination, and the corresponding near miss outcome is a symbol combination that is similar to, but slightly different than the symbol combination associated with the designated outcome. In one embodiment, the second combination of symbols is based on the first combination of symbols.

For example, in a slot machine game embodiment, if the designated outcome is a specific generated symbol combination, a near miss or nearly missed outcome is a specific generated symbol combination wherein one symbol required for the designated outcome is generated at the wrong reel stop position such as an adjacent reel stop position. In another example, in a poker game embodiment, if a designated outcome is a royal straight flush, a near miss or nearly missed outcome is four of the five cards for a royal straight flush where the fifth card is the wrong suit or the wrong value of the required card for the royal straight flush. It should thus be appreciated that a designated near miss outcome may still be a winning outcome without the near miss award (e.g., a straight instead of a royal straight flush).

In one embodiment, the gaming device automatically provides a near miss award upon the generation of a near miss outcome. In this embodiment, the gaming device generates an outcome and evaluates if the generated outcome is one of the near miss or nearly missed outcomes associated with the designated outcome. If the outcome is one of the near miss outcomes, the gaming device provides a near miss award from a near miss insurance pool or fund.

The near miss award may be an award or an award opportunity. The award may be any suitable award, such as, but not limited to a fixed award, a changing award such as a progressive award, or a prize such a physical prize or service. The award opportunity may be any suitable opportunity to obtain an award, such as, but not limited to a number free activations or spins, or an entry into a tournament. In one embodiment, the value of the award is less than the value of the award associated with the corresponding designated outcome. For example, where the designated outcome corresponds to a top large progressive jackpot award such as $10,000,000, the award is a small percentage of the value of the progressive jackpot award, such as 0.1% or $10,000. In this embodiment, the player's disappointment that they nearly obtained the larger award would be significantly offset by receiving the award of a relatively large win of $10,000 compared to the medium and lower values more often provided by the gaming machine. It should be appreciated that the award could be any suitable amount which could be related to the amount of the top award or independent thereof. The near miss award could be fixed or predetermined, or could change. It should also be appreciated that the near miss award could be predetermined, randomly determined, based in part as the player's wager, based on the player's status (such as the status of the player determined through a player tracking (and system), independently determined or determined in any suitable manner. If the near miss outcome is itself a winning outcome, in alternative embodiments, the near miss award may additionally be provided to the player or may not be provided to the player because they already obtained the winning outcome. The near miss award may be advertised to the player such as through signage on through the gaming machine or maintained secret from the player.

In one embodiment, upon the generation of a near miss outcome associated with the designated outcome, the gaming device provides the player with a near miss award, where the near miss award is one or more award opportunities or additional chances to obtain the designated outcome. In this embodiment, the gaming device evaluates if the generated outcome is one of the near miss outcomes associated with a designated outcome. If the generated outcome is a nearly missed or near miss outcome, the gaming device provides the player with one or more additional opportunities to achieve the corresponding designated outcome or fund. If the player subsequently achieves the designated outcome on the additional opportunity, the gaming device provides the player with an award which is funded by the near miss insurance pool or fund. In one embodiment, the value of the award is the same as the value of the award associated with the designated outcome. In another embodiment, if the player achieves the designated outcome on the additional opportunity, the award is a small percentage of the value of award associated with the corresponding designated outcome. For example, if the value of the award associated with the designated outcome is $10,000,000, the value of the award funded by the near miss insurance pool may be $10,000 or less. In these embodiments, the near miss insurance pool or fund provides the funding to allow the player an additional opportunity to turn a particularly frustrating loss into at least a partial win.

As briefly indicated above, in another embodiment, upon the generation of a near miss outcome associated with the designated outcome, the gaming device provides the player a near miss award that includes a number of free activations or spins. For example, the near miss award may provide the player with fifteen free activations or spins. In one embodiment, another near miss insurance pool is used to fund any awards generated from the free activations or spins. In another embodiment, the gaming device includes a bonus game and the near miss award is a number of plays of a bonus game.

In one embodiment where the gaming device provides a slot game, upon the generation of a near miss outcome, the gaming device provides a second chance or additional opportunity to obtain the designated outcome. In this embodiment, the additional opportunity to obtain the designated outcome includes at least one re-spin or re-activation of one or more of the reels. If the winning combination is obtained from the additional opportunity, the gaming device provides the player an award funded by the near miss insurance pool where the award is based on the designated outcome. In one embodiment, if the designated outcome is generated on the additional opportunity, the value of the award is a percentage of the award associated with the designated outcome. It should be appreciated that the award could be any suitable amount which could be related to the top award, a designated award, or independent thereof. The award could be fixed or predetermined, or could change.

In another embodiment, the additional opportunity to obtain the designated outcome includes randomly changing the shape, direction or orientation of one or more paylines. In this embodiment, the payline may be bent in such a way as to include the required symbol.

In one embodiment, where the gaming device provides a slot game, a designated outcome is a predefined combination of symbols generated on a payline. In one example, the slot game includes five reels and a payline, wherein each reel defines a number of stop positions. In this example, a designated outcome occurs if the gaming device generates five like symbols on the payline. The near miss outcome associated with the designated outcome occurs if the gaming device generates four like symbols on the payline and the fifth like symbol is generated on the fifth reel at least one reel stop position away from the payline. It should be appreciated that the near miss outcome may include any number of required symbols appearing any number of stop positions away from the payline. In addition, the near miss outcome may include four like symbols where the fifth like symbol is not generated on the reel.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels or symbol positions (i.e., not on paylines passing through any displayed winning symbol combinations). In this embodiment, a designated outcome is an associated combination of symbols occurring on active symbol positions. If a designated outcome is generated on the reels, the gaming device provides the player one award for that occurrence of the generated winning symbol combination. For example, if one designated outcome is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines.

In one such embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to achieve the designated outcome. In one embodiment, if based on the player's wager, a reel is not activated, then a designated number of default symbol positions, such as a single symbol position of the middle row of the reel, will be activated and the default symbol position (s) will be part of one or more of the ways to win. This type of gaming machine enables a player to wager on one or more of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment, the near miss outcome associated with the designated outcome occurs if a winning symbol combination occurs, but at least one of the symbols required for the winning combination occurs in a non-active symbol position. For example, the player may have wagered less than the maximum number of credits, such that one or several symbol positions remain inactive. In this example of a near miss outcome, if the player would have wagered the maximum number of credits the symbol positions would have become active and the player would have achieved the designated outcome.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, after the gaming device has analyzed each of the strings of related symbols and compared them to the paytable to determine any awards to provide the player, the gaming device additionally determines if the player has obtained a designated nearly missed outcome. In one embodiment, on a five reel slot game where a string of five related symbols is a winning outcome, a designated nearly missed outcome occurs when the player obtains a string of four related symbols. In one embodiment, the designated outcome occurs when the player obtains a string of four related symbols on active positions on any four of the reels and the fifth related symbol appears on an inactive position on the fifth reel. In one embodiment, the designated outcome occurs when the player obtains a string of four related symbols on active positions on the first four reels and the fifth related symbol appears on an inactive position on the fifth reel. If the player obtains a designated nearly missed outcome, the gaming device provides the player a designated near miss award. In one embodiment, the player must wager the maximum number of credits to be eligible for the designated near miss award.

The near miss insurance pool or fund may be funded in any suitable manner. In one embodiment, the gaming device allocates a portion of each wager placed at the gaming device to the near miss insurance pool or fund. Therefore, a percentage of each wager made on the gaming device is dedicated to an independent account, fund or insurance pool. In another embodiment of the present invention, a plurality of individual gaming devices are in communication or linked to one another, and a portion of each wager placed at each of the linked gaming devices is allocated to fund the near miss insurance pool or fund. For example, the near miss insurance pool may be funded by only a particular type of gaming machine, a group of gaming machines in a particular physical location, or by particular gaming machines during a given time period. In an alternative embodiment, only portions of certain wagers are applied to the near miss insurance pool or fund.

In another embodiment, the gaming device provides for an optional secondary wager or qualifying wager, and the near miss insurance pool or fund is funded by at least a portion of this secondary wager. In this embodiment, the player must place the optional secondary wager to be eligible to receive a near miss award, wherein the near miss award is an award or an award opportunity. In another embodiment, the player qualifies for the near miss insurance pool by wagering the maximum number of credits on a given play, and a portion of the maximum bet is allocated to the near miss insurance pool or fund.

In another embodiment, the near miss insurance pool or fund is funded by an optional secondary wager and a portion of every primary wager. Therefore, even if the player is not benefiting from the near miss insurance pool or fund, the player is contributing a small amount to it. This ensures that the near miss insurance pool or fund will grow or increase and be appropriately funded. In the rest of the application, the near miss insurance pool, fund or account is referred herein simply as the near miss insurance pool or insurance pool for brevity.

In one embodiment, a gaming system includes a central server or controller in communication with or linked to a plurality of gaming machines or gaming devices. In another embodiment, the gaming system includes a plurality of linked gaming machines wherein one of the gaming machines functions as the central server or controller. In these embodiments, the central server functions or serves as the near miss insurance pool controller for one or more of the gaming devices.

In one embodiment, the gaming system includes at least one and preferably a plurality of designated near miss awards adapted to be provided to one or more players at the gaming machines in the gaming system. In one embodiment, the central server includes at least one and preferably a plurality of near miss insurance pools. Each near miss insurance pool is adapted to maintain one or more separate near miss awards. In one embodiment, the gaming system disclosed herein provides that a player at a first gaming device is eligible to win the designated near miss award associated with the first gaming device and may be further eligible to win a different designated near miss award associated with a second independent gaming device or second group of gaming devices.

In this embodiment, based on one or more suitable factors, such as a side wager or the player's status in a player tracking system, the player of the first gaming device becomes eligible to win the near miss award associated with the second gaming device or second group of gaming devices. Accordingly, such a gaming device provides for the selective activation of one or more designated near miss awards (which are different than the designated near miss award(s) associated with the player's currently played gaming device), wherein the player is provided a chance to obtain one, more or each of the selectively activated near miss awards.

In one embodiment, each progressive module tracks and maintains a separate one of the near miss awards. In another embodiment, one or more near miss modules each maintain a plurality of near miss awards. In one embodiment, one or more near miss modules are each associated with one or more gaming devices in the gaming system. In this embodiment, if a gaming device is associated with a near miss module, a portion of each wager made on that gaming machine funds the near miss insurance pool maintained by the associated near miss module. In one embodiment, if a gaming device is associated with a near miss module, upon a suitable triggering event, the designated near miss award (or one or more of the plurality of designated near miss awards) maintained by the near miss module is provided to a player of one of the gaming devices associated with that progressive module.

In one embodiment, the gaming system operator may add one or more gaming devices to each near miss module as desired. It should be appreciated because all of the gaming machines are already in communication with the central server, adding a gaming machine or a bank of gaming machines merely requires establishing communication with the gaming machine or bank of gaming machines and the associated near miss module.

In one embodiment, in addition to each gaming device adapted to provide the near miss award associated with that gaming device (i.e., the primary or default near miss award), the central server enables players at one or more gaming devices in the gaming system to place side bets on one or more designated near miss awards or near miss insurance pools associated with other gaming devices which they wish to be eligible for. In this embodiment, if a player places one or more side bets, their respective gaming machine are connected to the associated near miss module(s) which maintain the near miss awards or near miss insurance pools which the player places side-bets on. That is, each gaming machine is connected to or otherwise is in association with the near miss modules that match the player's side bet. For example, if a player is playing a first gaming device associated with a first default near miss award or near miss insurance pool and the player places a side bet or side wager on a second supplemental near miss award or near miss insurance pool which is associated with a second gaming device (and not associated with the first gaming device), the player's side bet provides the player a chance of obtaining the second supplemental near miss award in addition to the player's existing chance of obtaining the first default near miss award. The determination of whether a player at a gaming device is provided either a default near miss award or a supplemental near miss award is based on a generated symbol or symbol combination, based on a random determination by the central controller, based on a random determination at the gaming machine, based on a side wager placed, predetermined, randomly determined, determined based on the player's primary game wager, determined based on the player's status (such as determined through a player tracking system), determined based on a level of a progressive award, determined based on time (such as the time of day) or determined based on any other suitable method or criteria.

In one embodiment, the near miss insurance pool can be active or inactive based on server based gaming. For example, the near miss insurance pool can be active when the gaming establishment is busy, when it is slow, or at random times during a day or week.

In other embodiments, the insurance pool can be operable with a plurality of all games in a gaming establishment or multiple gaming establishments in a server based gaming environment. In one example, the system enables the player to carry over the operation of the insurance pool to another game. In another example, the pool may operate differently for a plurality or each server based game offered. For instance, the pool may be activated in a particular mode for game x, y, z and yet another for game a, b, c. This operation in one embodiment, can work in conjunction with server based gaming controlled awards, loyalty promotions and/or loyalty sponsored insurance pool modes.

In one embodiment, the insurance pool is derived or funded at least in part from the casino or gaming establishment. In another embodiment, the insurance pool is derived or funded at least in part from the venue, also be derived from external sources such as sponsors. The sponsors are allowed to include advertising or promotions until the sponsored pool is exhausted in one embodiment. This mode may include a full sponsored insurance pool or partial insurance pool wherein the combination of the external sponsorship is augmented by a percent of the game play wagering. In another example, various game type offerings may be sponsored by different external sources. For example, game x, y, z by 'the Big Softdrink' Co. LLC. and game a, b, c by 'the Big Food Chain.' These sponsorship opportunities are provided to one or more gaming machines in a server based environment. Additionally, aside from the insurance pool aspect, the server based gaming sponsorship mode in one embodiment provides for the allocation of various prize or promotional offerings once the player decides to terminate play or move to a different insurance pool.

Server based gaming also enables certain dynamics to be added to any game so optioned by the player. Thus, the server based gaming back-end may have several insurance pools from which the player may draw a new opportunity. One may be a standard mode, wherein a percent of the wager is allocated to the player's insurance pool. Another may be a communal pool, which accumulates a percentage of each wager from each player. In one embodiment, the player may opt for a portion of the pool to be allocated to a random award that is not associated with a near miss condition.

In an embodiment, the server based gaming allows the player to participate in a plurality of insurance pools. In an embodiment, player tracking technologies provide the player with an option to access a supplemental insurance pool or persistence insurance pool which they have accumulated over previous game play sessions. These pool may also be used by the venue to promote loyalty by applying various schemes or promotional points which can be optioned as required by the player during server based gaming operation. The loyalty point system operated by the server and in a persistence mode (even across venues) may award play only wager credits for loyalty, sponsorship play only credits which are associated with Dynamic Advertising and venue promotion credits for operation and venue spend associated promotions (i.e., restaurant visit promo credits, show credits, or room spend credits).

In yet another aspect enabled by server based gaming, players operating like server based gaming game offerings could via a secure server mechanism transfer persistent or dynamic insurance (so associated with their game play) to that of another nominated player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, the near miss insurance pool is funded by the gaming establishment through a special near miss promotion. For example, the gaming establishment could deposit fifty-thousand dollars into the near miss insurance pool for one or more designated near miss awards. In one such embodiment, the players may obtain awards from near miss insurance pool until the funds have been depleted. In this embodiment, the players do not fund the pool with a portion of their wager. In another embodiment, the near miss insurance pool may be funded by a combination of a near miss promotion and a portion of each wager. It should thus be appreciated that the near miss insurance pool may be funded in any suitable manner. It should also be appreciated that the near miss insurance pool is in one embodiment independent of the paytable(s) for the gaming device(s), and thus the awards are separate from the paytable(s).

It is therefore an advantage of the present invention to provide a gaming device which provides a near miss award for almost obtaining a designated outcome, where any awards are funded by a separate near miss insurance pool.

Another advantage of the present invention to provide a gaming device which provides an additional opportunity to obtain a award after the player obtains a near miss outcome, where any awards are funded by a separate near miss insurance pool.

Another advantage of the present invention is to provide a near miss insurance pool in which the player can become eligible for the pool by making a separate wager and achieving a near miss outcome.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
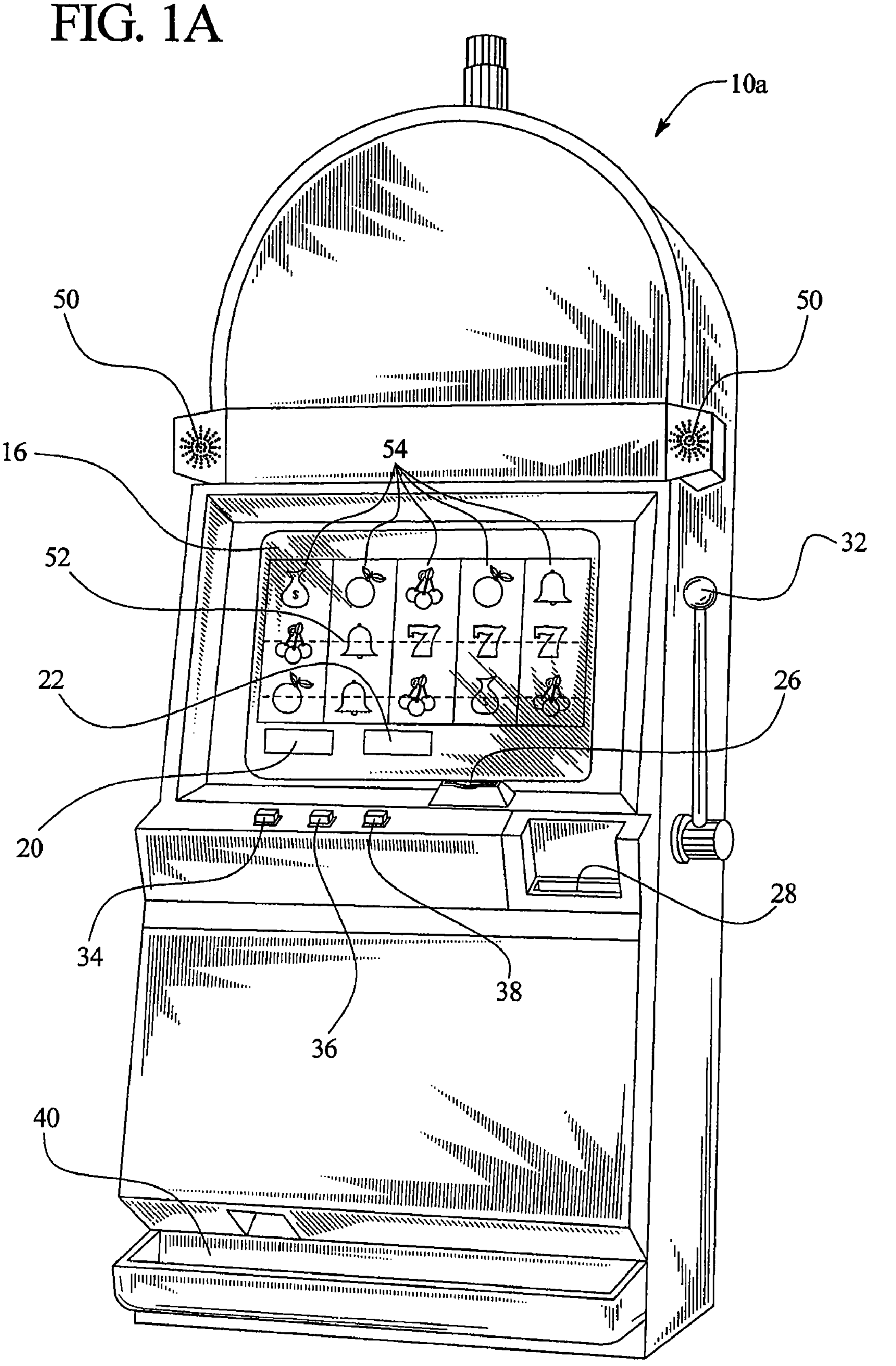
FIGS. 1A and 1B are front perspective views of various embodiments of a slot machine embodiment of the gaming device of the present invention.
Figure 1B:
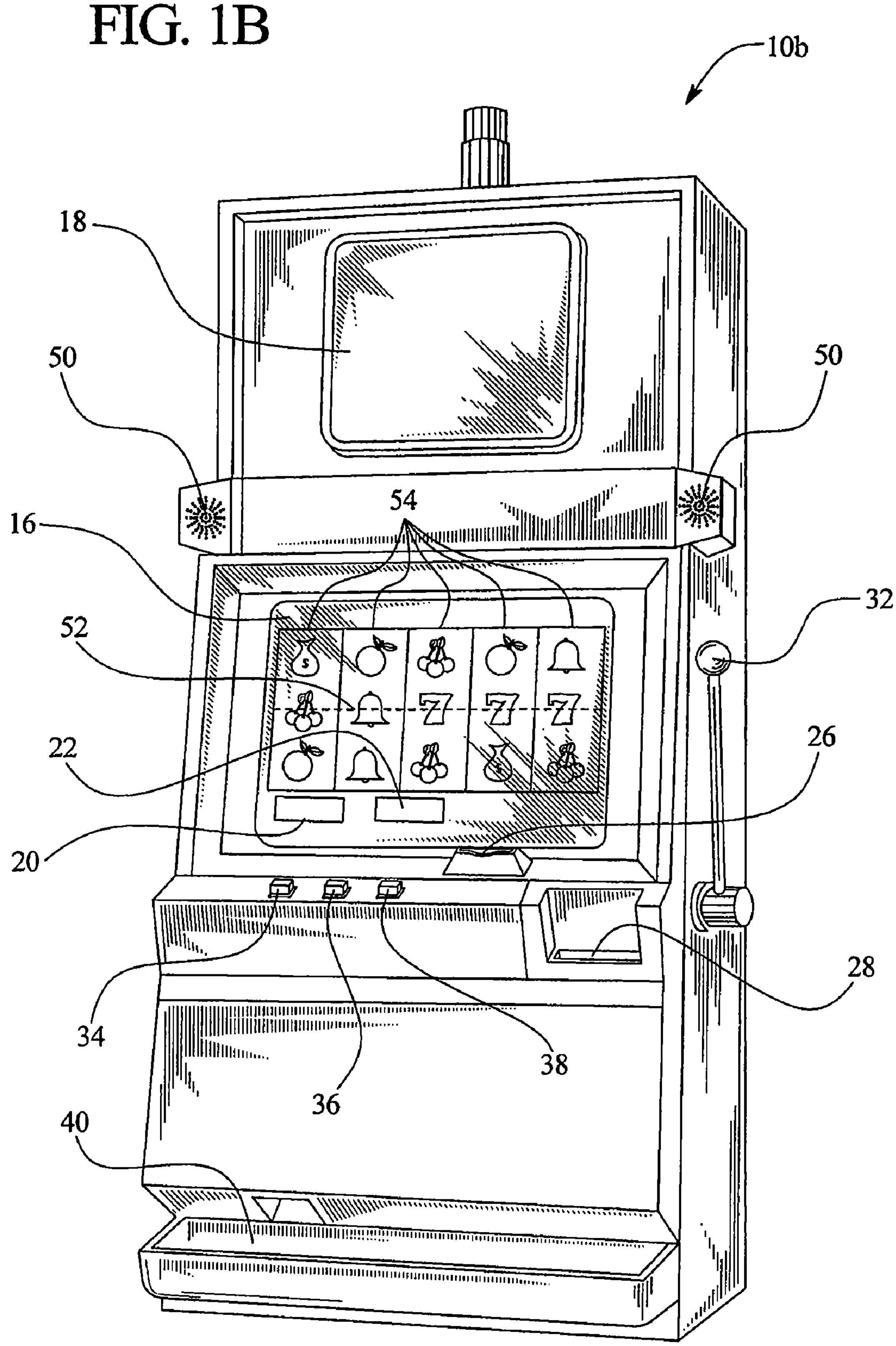

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
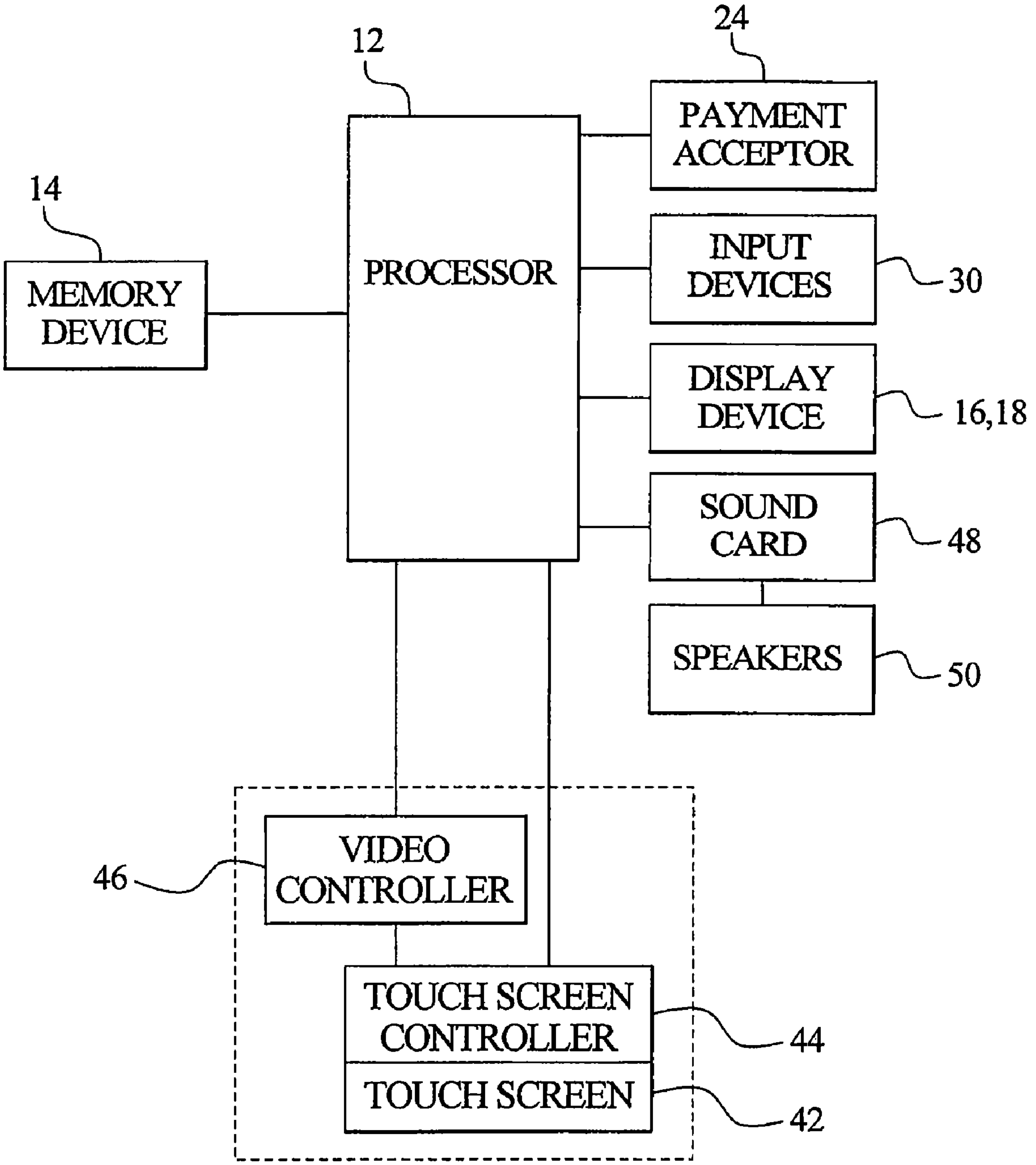
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
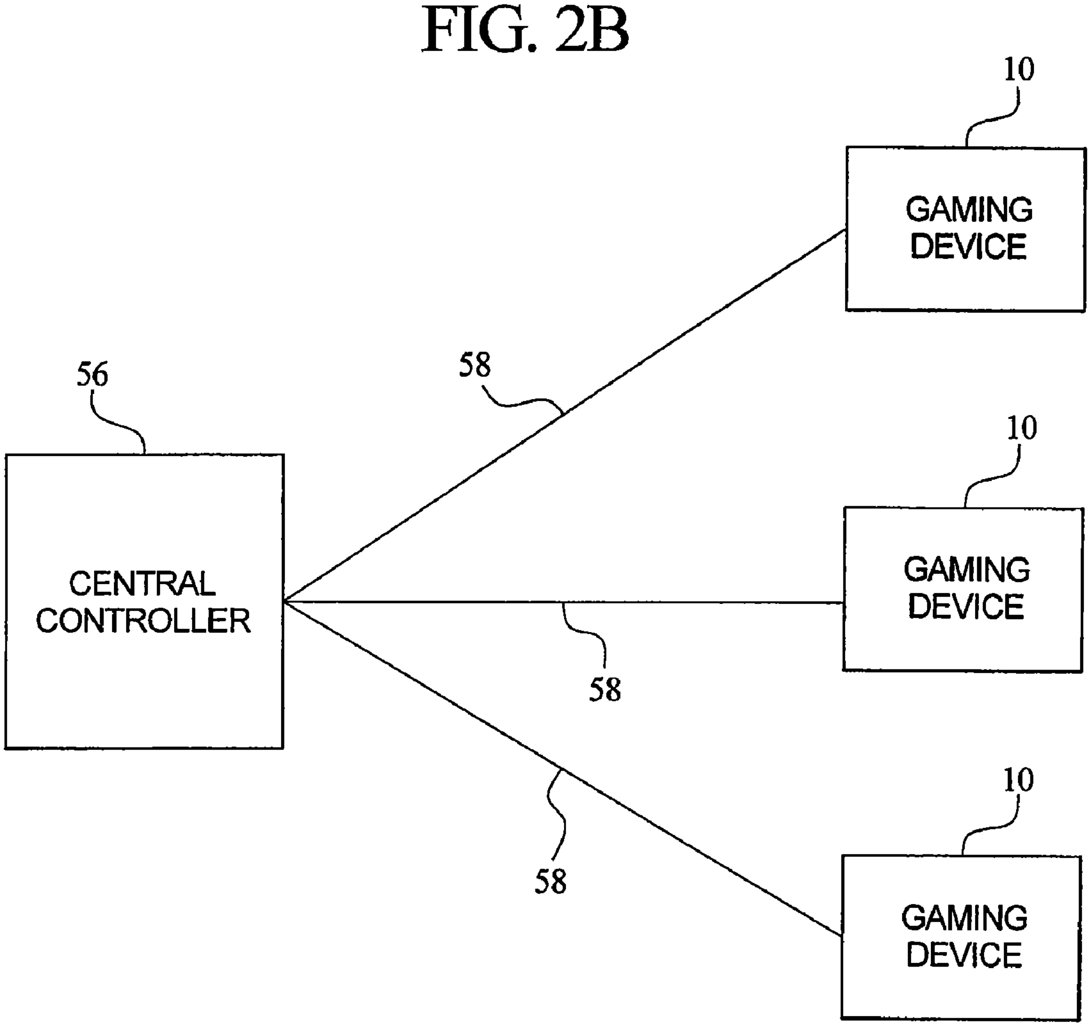
FIG. 2B is a schematic block diagram illustrating a plurality of gaming devices in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN)

in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In one embodiment, the gaming system includes a plurality of linked gaming machines wherein one of the gaming machines functions as the central server or controller. In these embodiments, the central server functions or serves as the progressive controller for one or more of the gaming machines. In one embodiment, the gaming system includes at least one and preferably a plurality of progressive award pools adapted to be provided to one or more players at the gaming machines in the gaming system. In one embodiment, the central server includes at least one and preferably a plurality of progressive modules. Each progressive module is adapted to maintain one or more separate progressive award pools. In one embodiment, the gaming system disclosed herein provides that a player at a first gaming device is eligible to win the progressive award associated with the first gaming device and may be further eligible to win a different progressive award associated with a second independent gaming device or second group of gaming devices.

In one embodiment, each progressive module tracks and maintains a separate one of the progressive award pools. In another embodiment, one or more progressive modules each maintain a plurality of progressive award pools. The determination of if a player at a gaming device is provided either a default progressive award or a supplemental progressive award is based on a generated symbol or symbol combination, based on a random determination by the central controller, based on a random determination at the gaming machine, based on a side wager placed, predetermined, randomly determined, determined based on the player's primary game wager, determined based on the player's status (such as determined through a player tracking system), determined based on a level of a progressive award, determined based on time (such as the time of day) or determined based on any other suitable method or criteria.

In one embodiment, the progressive controller of the central server is associated with a player tracking system (implemented through a player tracking card or other suitable manner). In this embodiment, the central server communicates with the player tracking server which provides information utilized in the progressive gaming features. The player tracking system enables the use of progressives based on the player's current status or player tracking level with the casino. In one embodiment, the player tracking card determines which progressive award (or progressive award level a player is eligible for in a multi-level progressive configuration) based on the player's current status. Through this centralized system, a gaming system operator configures a gaming machine to enable progressives only for players of a certain status or provides that the highest level of a multi-level progressive is available only to players with the highest status.

Near Miss Outcome

Automatic Near Miss Insurance Payment

Figure 3:
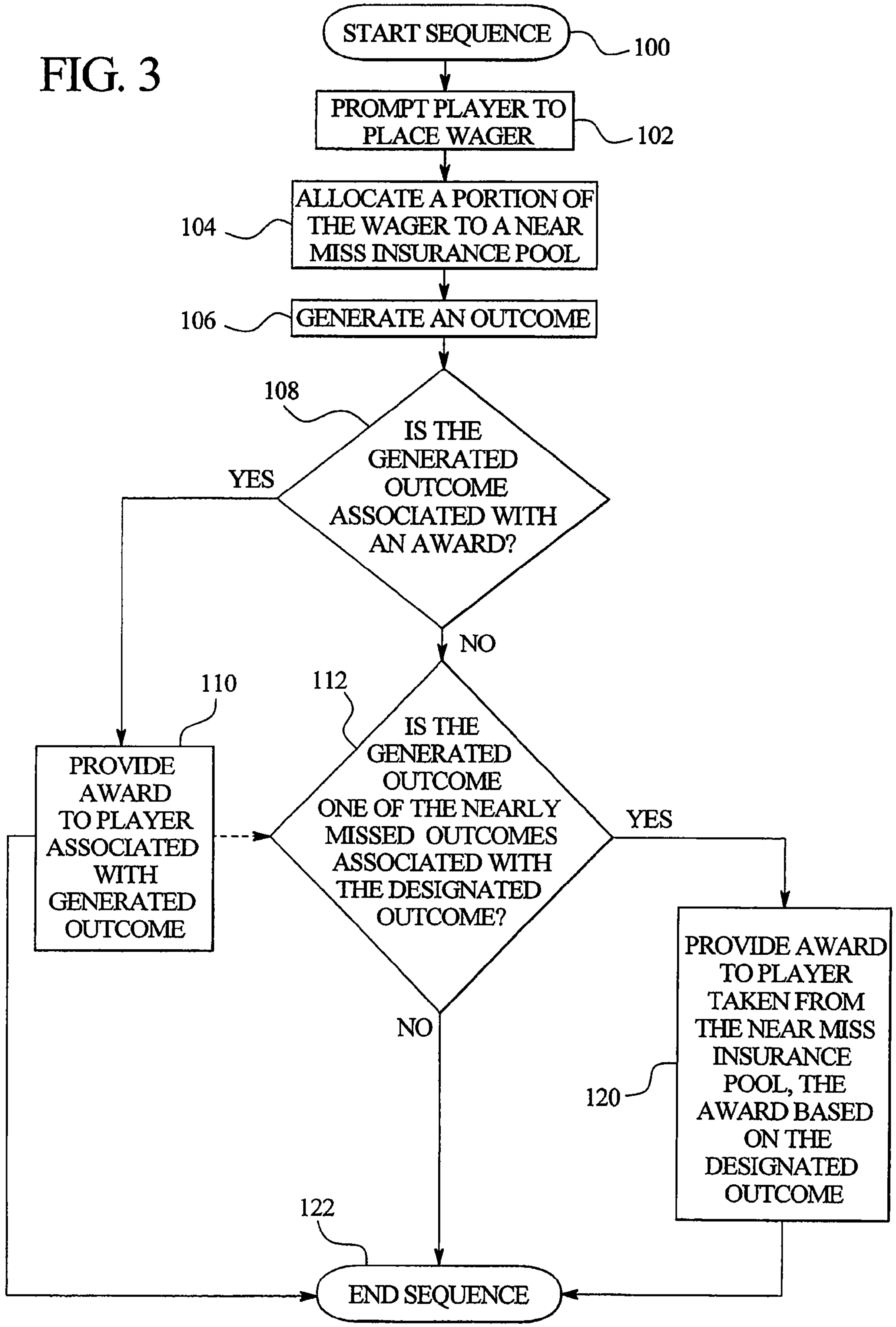
FIG. 3 is a flow chart diagram illustrating one embodiment of the present invention wherein the gaming device provides a near miss award to the player upon the generation of a near miss outcome.

The operation of one embodiment of the present disclosure is generally illustrated in FIG. 3, wherein upon the occurrence of a near miss outcome, the gaming device provides the player with a near miss award, where the near miss award is an award funded by a near miss insurance pool. In this embodiment, the gaming device initiates the game sequence as indicated in oval 100. The gaming device requires the player to make a wager on the game, as indicated by block 102. The gaming device allocates a portion of the wager to a near miss insurance pool, as indicated by block 104. The gaming device generates an outcome, as indicated by block 106. Generating an outcome in one embodiment includes generating a plurality of symbols and displaying the symbols on a display device. The gaming device evaluates the outcome to determine whether the generated outcome is associated with an award, as indicated by diamond 108. If the generated outcome is associated with an award, the gaming device provides the player with the award, as indicated by block 110. In one embodiment, after the gaming device provides the award, the game sequence ends, as indicated in oval 122. In another embodiment, after providing the player any award associated with the generated outcome, the gaming device evaluates whether or not the generated outcome is one of the plurality of nearly missed outcomes associated with the designated outcome, as indicated by diamond 112.

In one embodiment, a nearly missed outcome occurs when at least one of the plurality of symbols is in the wrong position, when one of the symbols is the wrong rank, suit, number or value, or when the symbols appear in the wrong order. It should be appreciated that the nearly missed outcome may be any suitable outcome that nearly constitutes the designated outcome.

In one example, in an embodiment where the game is a poker game, the nearly missed outcome or condition may be generating four out of five cards to a royal straight flush. In this example, the designated outcome would be the royal straight flush. In an alternative embodiment, the fifth card may need to be of the same rank or suit as the required fifth card to complete the winning combinations.

In another example, in an embodiment wherein the game is a keno game, the nearly missed outcome or condition may be matching nine out of the ten numbers generated by the gaming device. In this example, the designated outcome would be matching ten out of ten numbers correctly. In one embodiment, the number achieved must be adjacent to the missed number or within a range of the missed number. For example, the missed number may be 74 and the number achieved is 73, or alternatively the missed number is 74 and the number achieved could be within a range of plus or minus 3 (i.e., any number from 71 to 77). Other alternative definitions of the near miss outcome may be suitably employed.

Referring back to FIG. 3, if the generated outcome is not one of the plurality of near miss or nearly missed outcomes, the game sequence ends, as indicated in oval 122. If the outcome is one of the nearly missed outcomes, the gaming device provides the player an award funded by the near miss insurance pool wherein the award is based on the generated designated outcome, as indicated by block 120. In one embodiment, the award is a percentage of or related to the award associated with the designated outcome. Alternatively, the award is independent of the award associated with the designated outcome. The game sequence ends, as indicated in oval 122.

It should be appreciated that the near miss or nearly missed award can be any suitable award, such as a monetary award or one or more opportunities to obtain a monetary award. In one embodiment, the near miss award is an automatic insurance award of credits, as described above. In another embodiment, the near miss award is a number of free plays of the game (i.e., a number of award opportunities to obtain credits). In another embodiment, the near miss award is an additional opportunity to obtain the designated outcome, as in the alternatives described below.

Additional Opportunity to Obtain the Designated Outcome

Figure 4:
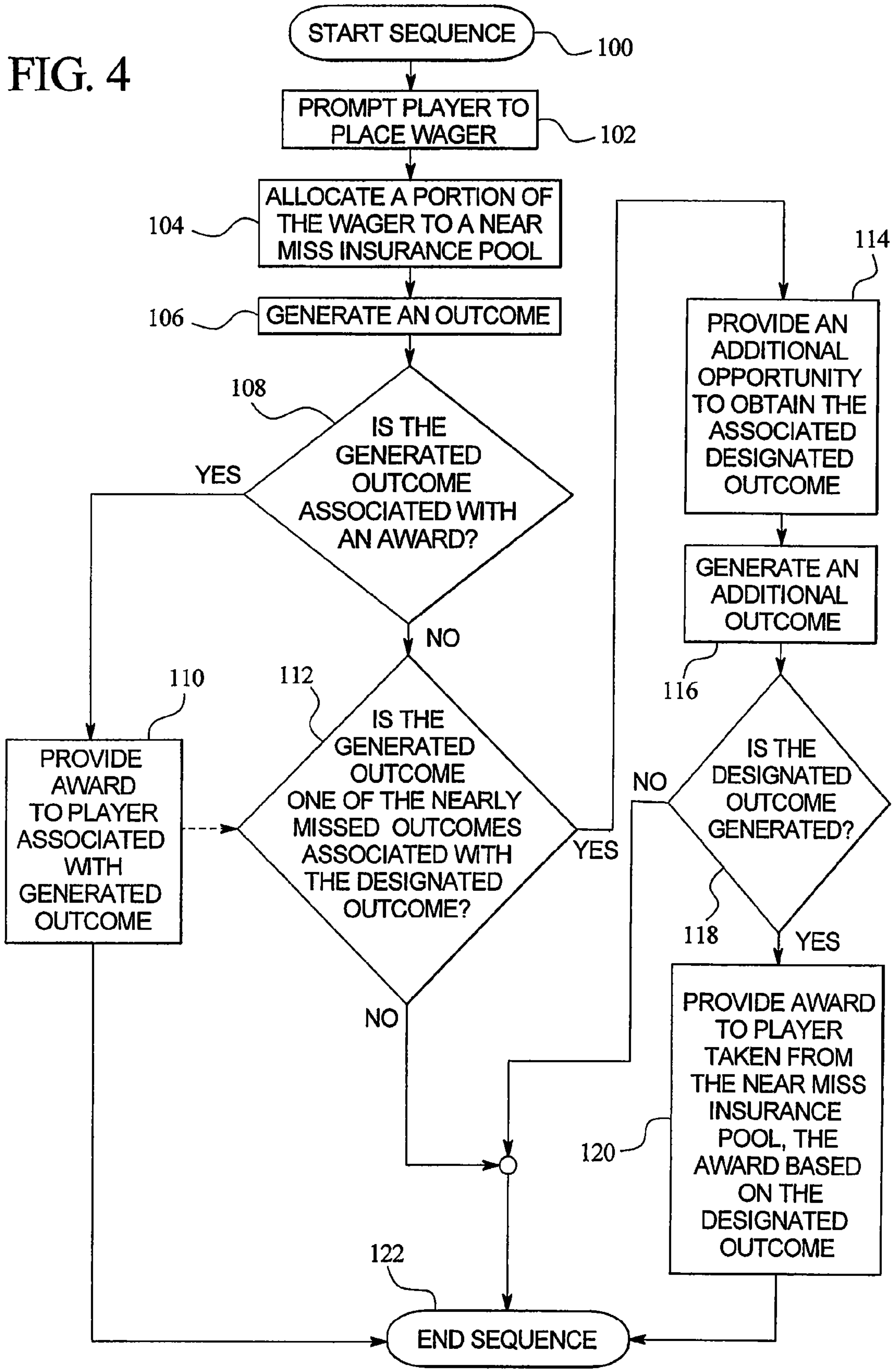
FIG. 4 is a flow chart diagram illustrating one alternative embodiment of the present invention wherein upon the generation of a near miss outcome, the gaming device provides an additional opportunity to achieve the designated outcome.

The operation of another embodiment of the present invention is generally illustrated in FIG. 4, wherein upon the occurrence of a near miss outcome, the gaming device provides the player with a near miss award that is a second chance or additional opportunity or award opportunity to obtain the corresponding designated outcome. In this embodiment, the gaming device initiates the game sequence, requires the player to make a wager, allocates a portion of the wager to a near miss insurance pool and generates an outcome as illustrated in blocks 100, 102, 104 and 106, respectively, and as described above in reference to FIG. 3. In this embodiment, the gaming device further evaluates the outcome to determine whether the generated outcome is associated with an award, and provides the player with any award, as illustrated in diamond 108 and block 110 and described above in reference to FIG. 4. In one embodiment, if the gaming device provides an award to the player, the game sequence ends as indicated in oval 122 and as described above. In another embodiment, even after the gaming device provides an award to the player, the gaming device evaluates if the generated outcome is a nearly missed outcome.

In one embodiment, if the generated outcome is not associated with an award, the gaming device evaluates whether or not the generated outcome is one of the plurality of nearly missed outcomes associated with the designated outcome, as indicated by diamond 112. If the generated outcome is not one of the plurality of designated nearly missed outcomes, the game sequence ends as indicated in oval 122.

In one embodiment, it is possible to simultaneously generate a winning outcome associated with an award based on a paytable, where the generated outcome is also one of the plurality of near miss outcomes (see, for example, FIG. 7 discussed below). In one example where the game is a slot game with five reels, a winning outcome may be four gold bars occurring on the payline, and a near miss outcome may be four gold bars occurring on the payline where the fifth gold bar occurs on a stop position adjacent to the payline. In this example, the gaming device provides the player with the award from the paytable associated with the winning outcome of four gold bars and also provide the player with a near miss award that is an additional opportunity to obtain the designated outcome of five gold bars. In another embodiment, none of the near miss outcomes are associated with awards provided on the paytable.

Referring back to FIG. 4, if the outcome is one of the designated nearly missed outcomes, the gaming device provides at least one near miss award that is an additional opportunity or award opportunity to obtain the associated designated outcome, as indicated in block 114, and generates the additional outcome, as indicated in block 116. The gaming device evaluates if the additional generated outcome is the designated outcome, as indicated in diamond 118.

For example, if the gaming device is a slot game and the nearly missed outcome includes four out of five like symbols on a single payline, the gaming device evaluates whether the additional generated outcome is the designated outcome of five like symbols on a payline. If the additional outcome is not the designated outcome, the game sequence ends, as indicated in oval 122. If the additional generated outcome is the designated outcome, the gaming device provides the player an award funded by the near miss insurance pool where the award is based on the designated outcome, as indicated by block 120. The game sequence ends, as indicated in oval 122.

In one embodiment, if the designated outcome is generated on the additional opportunity, the value of the award is a percentage of the award associated with the designated outcome. For example, where the designated outcome corresponds to a top large progressive jackpot award such as $10,000,000, the award would be a small percentage of the value of the progressive jackpot award, such as 0.1% or $10,000. It should be appreciated that the award could be any suitable amount which could be related to the top award of independent thereof. The award could be fixed or predetermined, or could change.

In one alternative embodiment, the gaming device provides the player with the near miss award that is an additional opportunity to obtain the designated outcome, the player has the option of exchanging the provided additional opportunity for an award. In this embodiment, the player may give up the near miss award that is an additional opportunity to obtain the designated outcome in exchange for a consolation award or a lesser award than that which is associated with the designated outcome. That is, the player may opt for a guaranteed win, rather than risking that a designated outcome will not be generated. In one embodiment, where the player has opted to use the additional opportunity or second chance, and the designated outcome is not generated, the gaming device may provide a consolation prize to the player. Therefore, in this embodiment, if a nearly missed outcome is generated, the player is guaranteed an award.

In one embodiment where the game is a slot game, the additional generated outcome is determined by a re-spin of one or more reels. In one example of this embodiment, where the near miss outcome includes missing the designated outcome by one symbol or symbol position on only one of the reels, only that particular reel is re-spun. In another embodiment, one or more reels are randomly selected and then re-spun. In this embodiment, the re-spun reel may not be the reel that included the symbol out of position. In an embodiment where the game in a keno game, the near miss outcome may be correctly matching nine out of ten numbers as discussed above. In this example, the additional generated outcome includes generating an additional number on the keno board such that the player has an additional opportunity to match their tenth number. In an embodiment where the game is a poker game, the near miss outcome may be generating four out of five cards to a royal straight flush, as discussed above. In this example, the additional generated outcome may include providing that player with an additional card such that the player has an additional opportunity to complete the royal straight flush. It should be appreciated that the additional outcome may be generated in any suitable manner such that the player has a chance of achieving the designated outcome.

In one embodiment, the player may directly purchase the near miss additional opportunity. In one embodiment, the player may purchase the near miss additional opportunity before the game starts. In other embodiment, the player may purchase the near miss additional opportunity during the game or at the conclusion of the game. In one embodiment, the near miss additional opportunity may be purchased as an optional side wager. In one embodiment, the player indirectly purchases the near miss additional opportunity by wagering a minimum number of credits. In one example, the minimum number of credits is the maximum possible wager. In another example, the minimum number of credits is a number less than the maximum wager, such as three credits out of a maximum possible wager of five credits. In another embodiment, the near miss award of an additional opportunity is provided to the player if the player has achieved a qualifying level of play, as described below.

Player Tracking

In one embodiment of the present invention the gaming device utilizes a player tracking card. Player tracking cards are typically specific to a gaming establishment or groups of gaming establishments, where the casino tracks the wagers that the player makes both on gaming machines and table games. One embodiment provides on the player tracking card a memory strip that stores an identification number. The memory strip, in an embodiment, is a magnetic strip commonly found on credit cards, debit cards and other types of computer readable cards. In one embodiment, the identification number on the tracking card corresponds to an identification number stored in memory on a central database. In one embodiment, the identification card is a smart card having a programmed microchip or a magnetic strip coded with a player's identification, credit totals and other relevant information. In another embodiment, the identification card is based on radio frequency identification (RFID).

In one embodiment, the tracking system keeps tracks of the number of times the player has played a particular game or how long the player has been playing. In another embodiment, if the player reaches a certain level of play, the player is eligible for the near miss award. Therefore, in one embodiment only the frequent players may be rewarded with the opportunity to achieve the near miss award.

In one embodiment, the player contributes a certain amount of each wager to a personal near miss insurance pool. In this embodiment, the tracking system of the gaming establishment keeps track of the player's personal near miss insurance pool. In this embodiment, the near miss insurance pool tracking card enables the player to eventually recoup amounts that the player personally funds through primary and secondary wagers, or through a one time payment as discussed above.

The tracking card can be used in a single casino or in multiple casinos and in designated types of gaming machines. In one embodiment, the tracking card can be used with designated machines, such as a bank of slot machines, a particular type of gaming machine, or with gaming machines having a designated wagering denomination such as a $1 minimum wager. In another embodiment, the tracking card can be used with slot and video versions of poker, Blackjack, Keno and any other suitable type of game that accommodates a designated nearly missed outcome. With a slot game as illustrated in FIGS. 1A and 1B, the tracking card is insertable in one embodiment into payment acceptor 14.

The tracking card can payout the near miss insurance funds in a variety of ways, such as in gaming device credits, physical tokens, redeemable cash, casino prizes, casino meals, reduced or free boarding as well as other events and services provided by a casino or gaming establishment. It should be appreciated that such near miss insurance amounts can be or may not be displayed to the players by the gaming machines.

Optional Qualifying Wager

Figure 5:
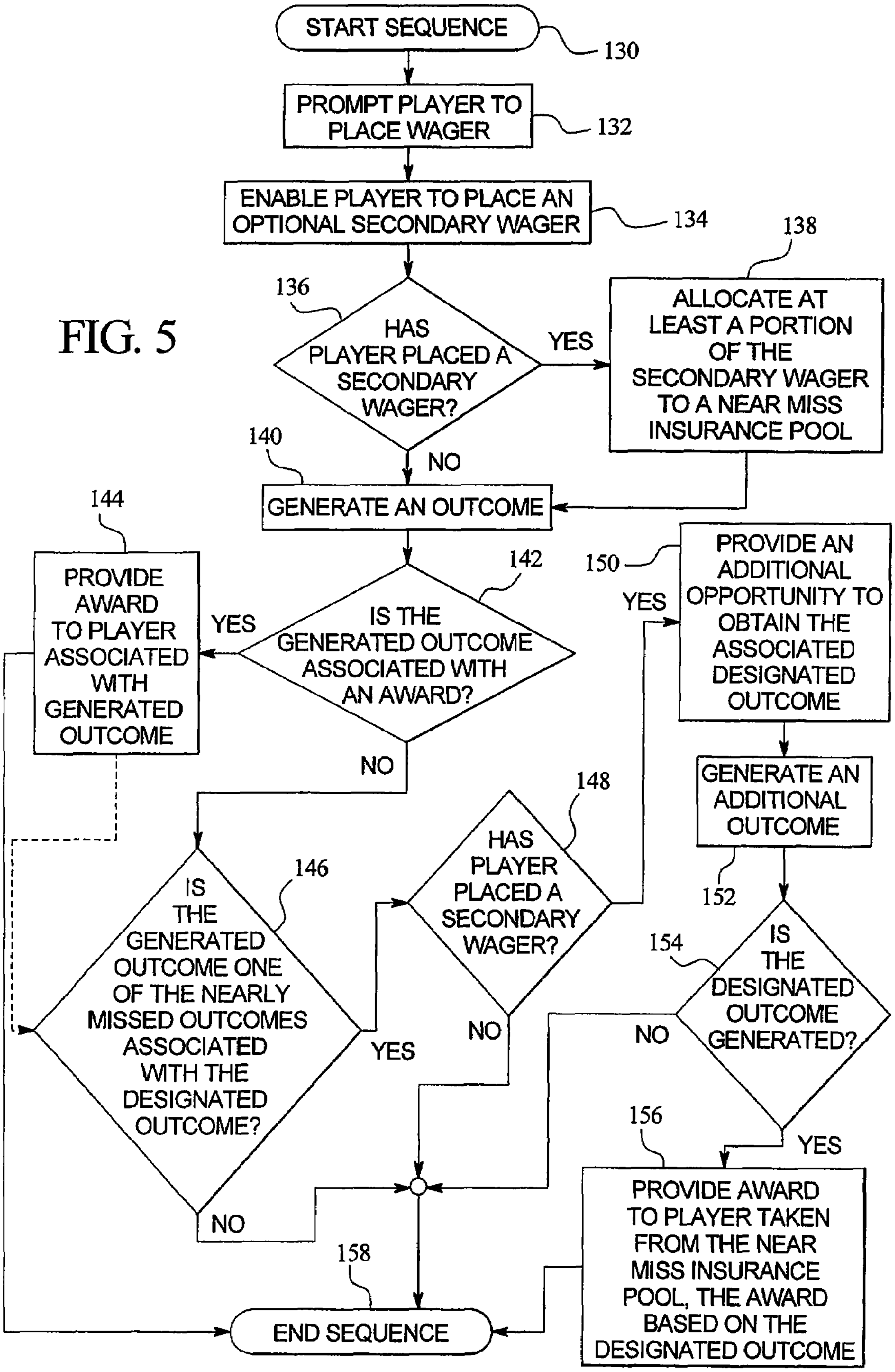
FIG. 5 is a flow chart diagram illustrating another alternative embodiment of the present invention wherein the player is eligible for the near miss insurance pool if the gaming device generates a designated nearly missed outcome and the player places an optional secondary wager.

The operation of one embodiment of the present invention is generally illustrated in FIG. 5, wherein the gaming device provides for an optional secondary wager that qualifies the player to receive a near miss award. In this embodiment, the gaming device initiates the game sequence as indicated in oval 130. The gaming prompts the player to make a primary wager to initiate a play of the game, as indicated by block 102. The gaming device enables the player to place an optional secondary wager, as indicated by block 134. If the player has placed the optional secondary wager, the gaming device allocates at least a portion of the secondary wager to a near miss insurance pool, as indicated in diamond 136 and by block 138. The gaming device generates an outcome, as indicated by block 140. The gaming device also evaluates if the generated outcome and provides any awards as discussed above in reference to FIG. 3. The gaming device evaluates whether or not the generated outcome is one of the nearly missed outcomes associated with the designated outcome, as indicated by diamond 146.

If the generated outcome is not one of the nearly missed outcomes associated with the designated outcome, the game sequence ends as indicated in oval 158. If the generated outcome is one of the designated nearly missed outcomes, the gaming device evaluates whether or not the player has placed the optional secondary wager, as indicated in diamond 148. If the player has not placed the optional secondary wager, the game sequence ends, as indicated in oval 158. If the player has placed the optional secondary wager, the gaming device provides a near miss additional opportunity to obtain the designated outcome, as indicated in block 150. That is, the player who has placed the optional secondary wager is rewarded with the near miss additional opportunity or second chance to obtain the award associated with the designated outcome.

The gaming device generates at least one additional outcome and evaluates if the additional generated outcome is the associated designated outcome, as indicated by block 152 and in diamond 154. If the additional generated outcome is not the designated outcome, the game sequence ends, as indicated in oval 158. If the additional generated outcome is the designated outcome, the gaming devices provides the player an award funded by the near miss insurance pool wherein the award is based on the designated outcome, as indicated by block 156. The game sequence ends, as indicated in oval 158.

In another embodiment, the gaming device evaluates whether or not the generated outcome is one of the nearly missed outcomes associated with the designated outcome. In this embodiment, if the generated outcome is one of the nearly missed outcomes, the gaming device generates at least one additional outcome regardless of whether or not the player has placed the secondary wager. However, if the player has not placed the secondary wager, the player is not eligible to receive the secondary award associated with any generated designated outcome. Therefore, the player who has decided not to place the secondary wager is able to see the results and any awards that they could have won. This provides additional incentive for the player to place the optional qualifying wager.

FIGS. 6A to 6E illustrate an example of a play of a game in accordance with the embodiment illustrated in FIG. 5, where the player must place the secondary qualifying wager in order to be eligible for the near miss insurance pool. This example of a play of the game results in the gaming device generating the designated outcome from the near miss additional opportunity and providing the player with an award that is funded from the near miss insurance pool.

This example of one embodiment of the present invention is configured on a conventional type slot machine for illustrative purposes. However, it should be appreciated that the invention could be played with a variety of alternative games, such as video draw poker and other poker variations (e.g., Pai Gow, Caribbean Stud, Texas Hold'em), Keno, roulette, and any other suitable video or table game that can generate a suitable near miss outcome. For example, a near miss in a draw poker game may be the player achieving four out of five cards to a Royal Straight Flush, where the fifth card is a nine of the same suit. In such an example, the player may have an additional opportunity to re-draw the fifth card to possibly obtain the Royal Straight Flush.

Referring back to FIGS. 6A to 6E, the display 200 displays a plurality of reels 202*a*, 202*b*, 202*c*, 202*d* and 202*e*, a plurality of paylines 204*a*, 204*b* and 204*c*, and a plurality of symbols displayed on the reels. The display includes a primary wager display 206, a secondary wager display 208, a total credits display 210, a total award display 212, and a near miss insurance pool display 214. In one embodiment, the near miss insurance pool is not displayed to the player.

Figure 6A:
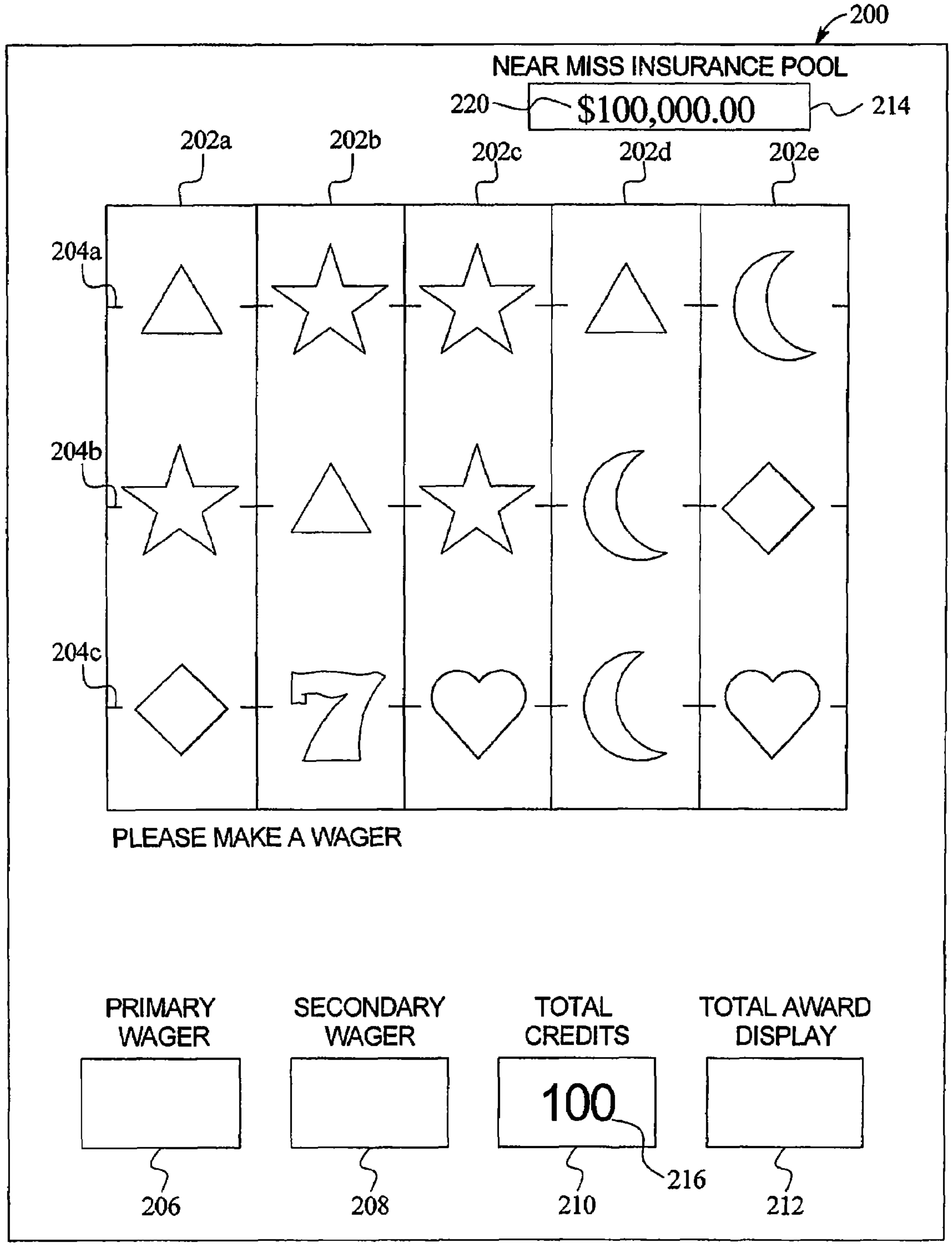
FIGS. 6A, 6B, 6C, 6D and 6E are elevation views of a display device showing one embodiment of the present invention.

Referring specifically to FIG. 6A, the gaming device prompts the player to make a wager. The player's initial total credits 216 are one-hundred as indicated by the total credits display 210. At this point, the player has not achieved any awards 218 as seen in the total awards display 212. Furthermore, the near miss insurance pool 220 has an initial value of $100,000.00 as indicated by the near miss insurance pool display 214.

Figure 6B:
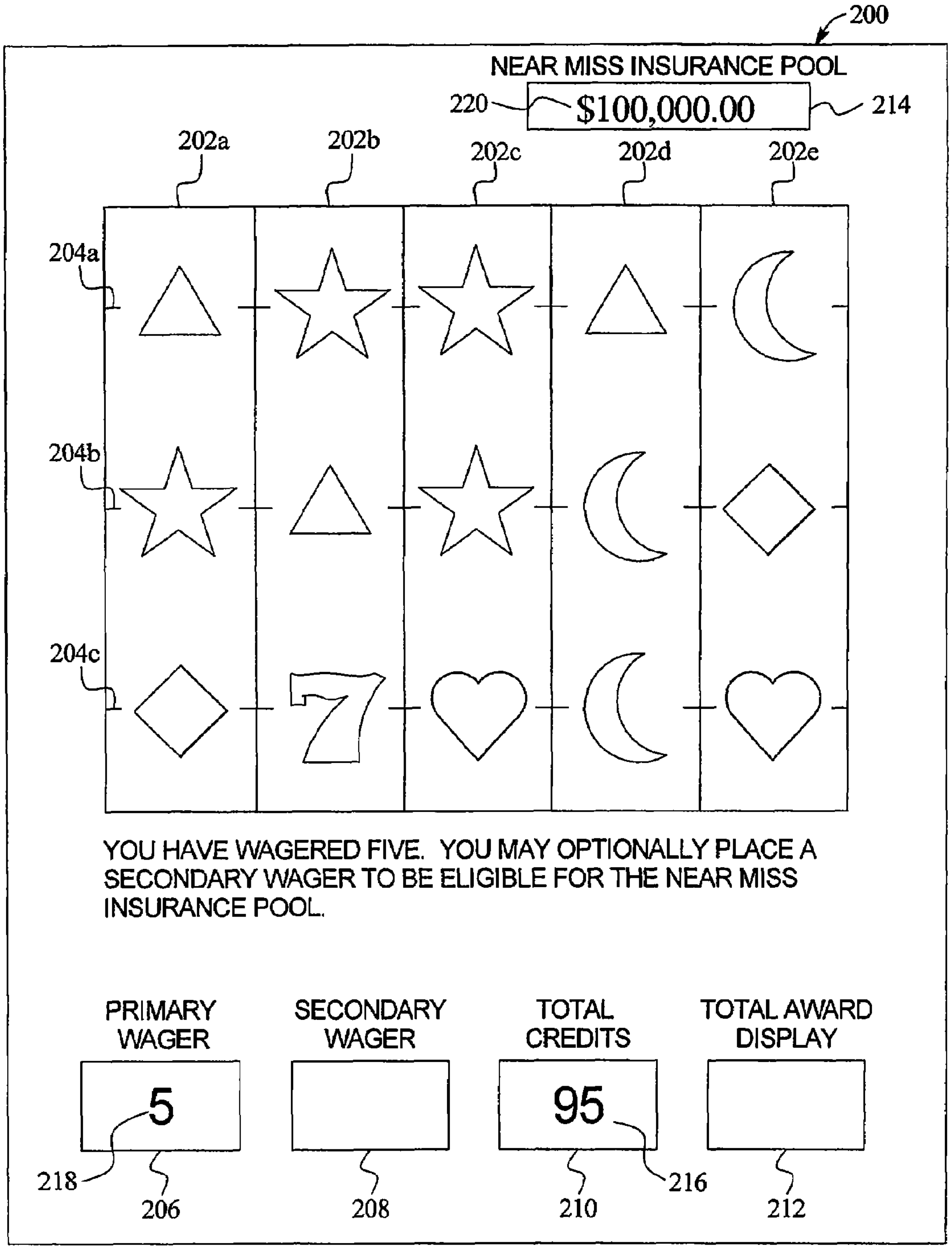

Referring now to FIG. 6B, the gaming device displays that the player has made a primary wager 206 of five credits or monetary units as indicated by the primary wager display 206. The player's total credits 216 are reduced to ninety-five as indicated in the total credits display 210. The gaming device enables the player to make an optional secondary wager as indicated on the display 200.

Figure 6C:
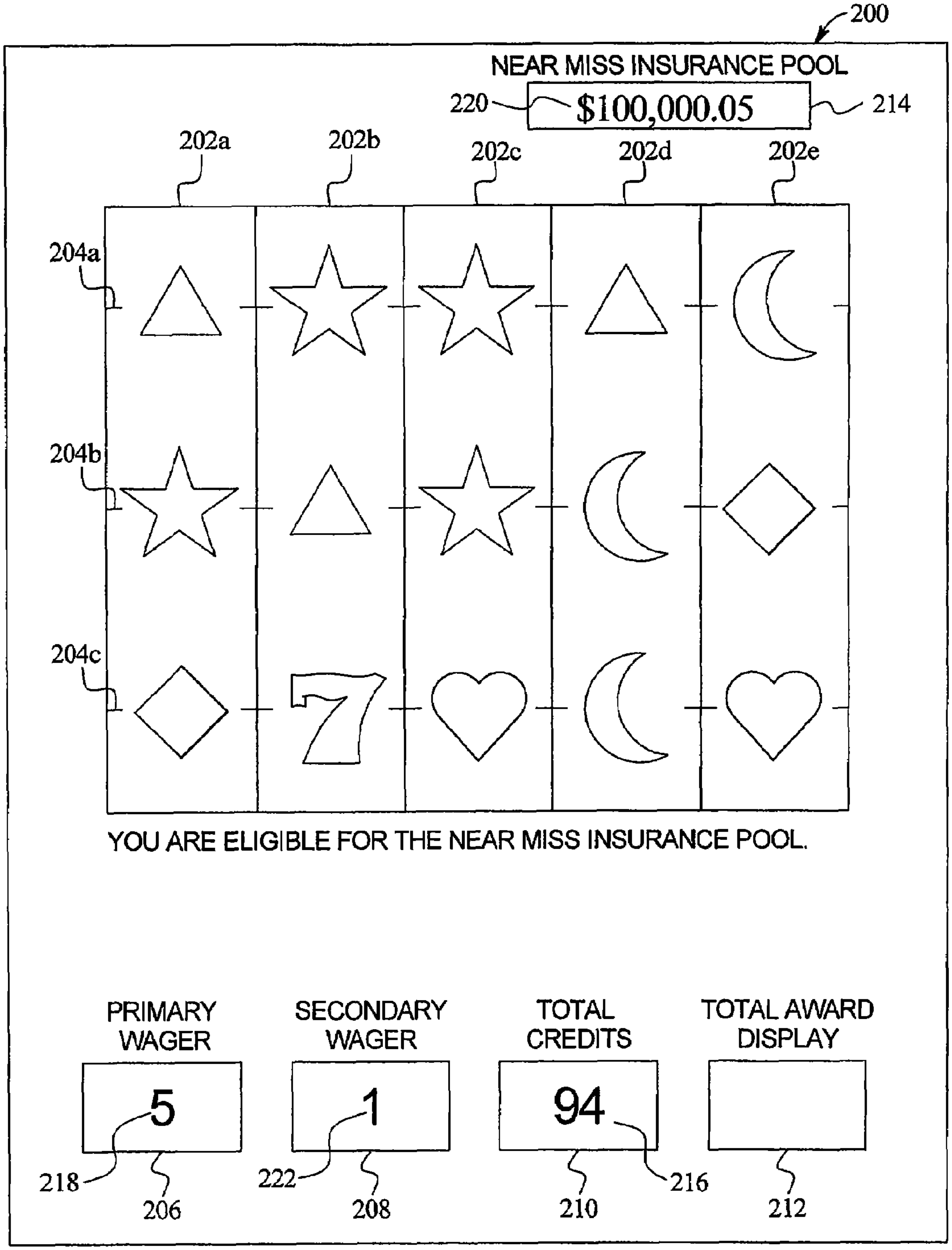

Referring now to FIG. 6C, the player has chosen to place an optional secondary wager 224 of one, as indicated in the secondary wager display 208. The player's total credits 216 are reduced to ninety-four as indicated in the total credits display. Also, the near miss insurance pool 220 is increased by five cents to a total of $100,000.05, as indicated by the near miss insurance pool display 214. In this embodiment, only a portion (i.e., five cents) of the player's secondary wager 224 is added to the near miss insurance pool 220. However, it should be appreciated that a smaller portion, a larger portion, or all of the secondary wager could be applied to the insurance pool 220. In other embodiments, all of the player's secondary wager 224 and/or a portion of the player's primary wager 222 could be used to fund the near miss insurance pool 220. In this embodiment, even players that are not eligible for the near miss insurance pool 220 (i.e., players that chose not to place the secondary wager) contribute a small amount of every first wager. Therefore, the pool always increases in one embodiment.

In one embodiment, one or more near miss insurance pools are funded, at least partially, via an amount provided by one or more marketing and/or advertising departments, such as a casino's marketing department. In this embodiment, when a near miss insurance pool increments to the amount of money provided by the marketing or advertising department (or any other designated amount), the near miss award is triggered and provided to one or more players that achieve a designated nearly missed outcome. It should be appreciated that the near miss insurance pool may be funded separately or in any suitable manner.

Figure 6D:
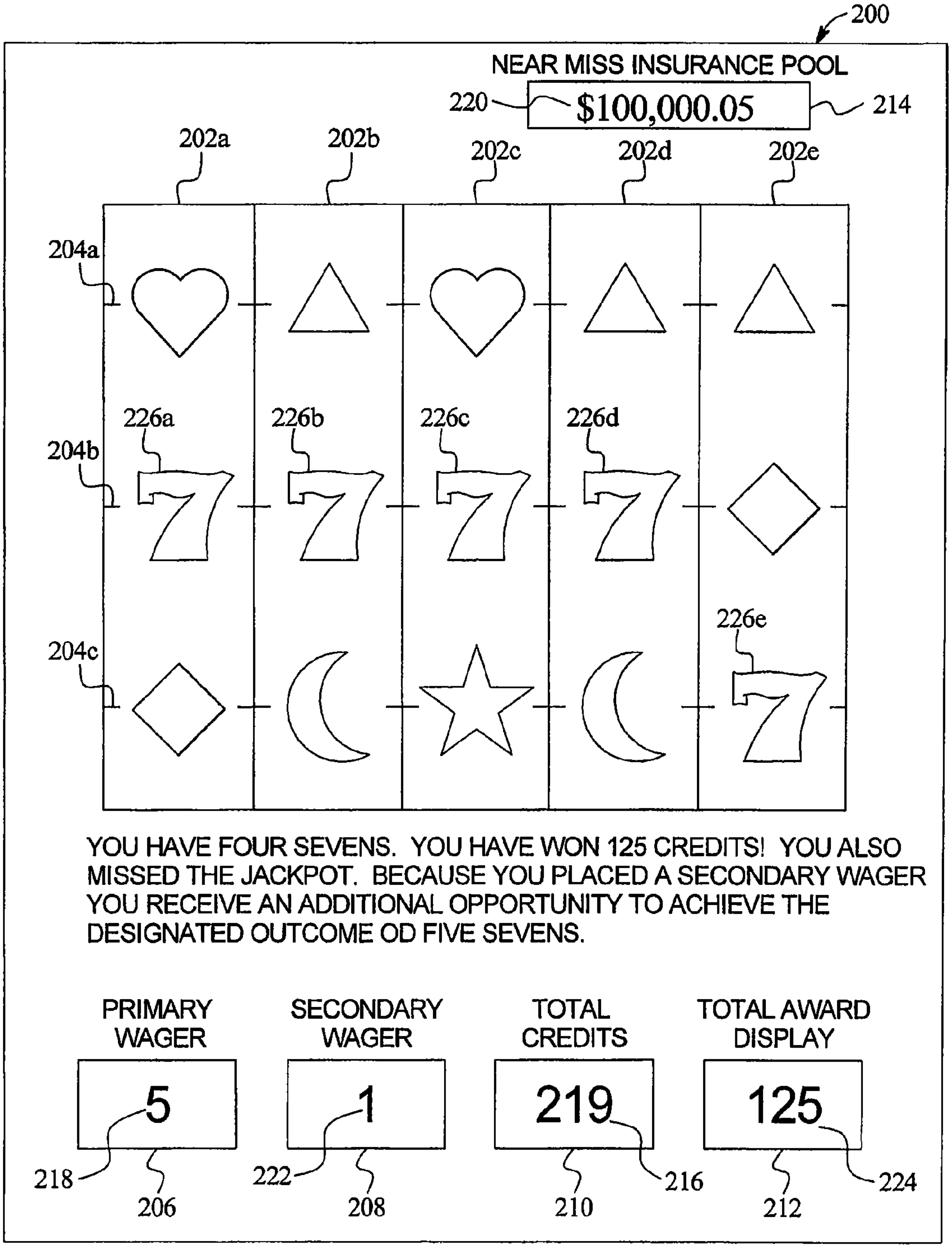

In FIG. 6D the gaming device generates an outcome by spinning the reels 202*a*, 202*b*, 202*c*, 202*d* and 202*e*. In one embodiment, many generated outcomes are associated with awards. In one example, the gaming device provides an award when the same symbol is generated on the first four reels 202*a* to 202*d* of any given payline 204*a*, 204*b* or 204*c*. Accordingly, the gaming device provides a much larger when the same symbol appears on all five reels 202*a* to 202*e* of any payline. In this example, the generated outcome is associated with an award because four sevens 226*a*, 226*b*, 226*c* and 226*d* appear on the second payline 204*b* on the first four reels. The gaming device provides the player with an award of one hundred twenty-five credits 218, as indicated in the total awards display 212. Likewise, the total credits 216 are increased to two hundred nineteen as indicated by the total credits display 210.

In one embodiment, one designated outcome occurs when the same symbol appears on all five reels of any payline. Also, one of the nearly missed outcomes associated with the designated outcome is where the gaming device generates the same symbol on the first four reels 202*a*, 202*b*, 202*c* and 202*d* of one payline 204, and generates the same symbol on a different payline 204*a* or 204*c*. In this example, the generated outcome is a nearly missed outcome because four sevens 226*a*, 226*b*, 226*c* and 226*d* appear on the first four reels of the second payline 204*b* and a fifth seven 226*e* appears on the fifth reel of the third payline 204*c*.

It should be appreciated that a designated outcome may be any suitable symbol or combination of symbols, such as any combination of symbols on a payline, or a number of symbols scattered across the reels. Furthermore, the nearly missed outcomes associated with the designated outcome are not limited to a fifth symbol appearing on the fifth reel on a reel stop position adjacent to the payline, but may be any suitable outcome closely resembling the designated outcome. For example, in one embodiment a nearly missed outcome occurs when the gaming device generates the same symbol of the first, third, fourth and fifth reels of one payline, and generates the same symbol on a different reel stop position on the second reel.

Figure 6E:
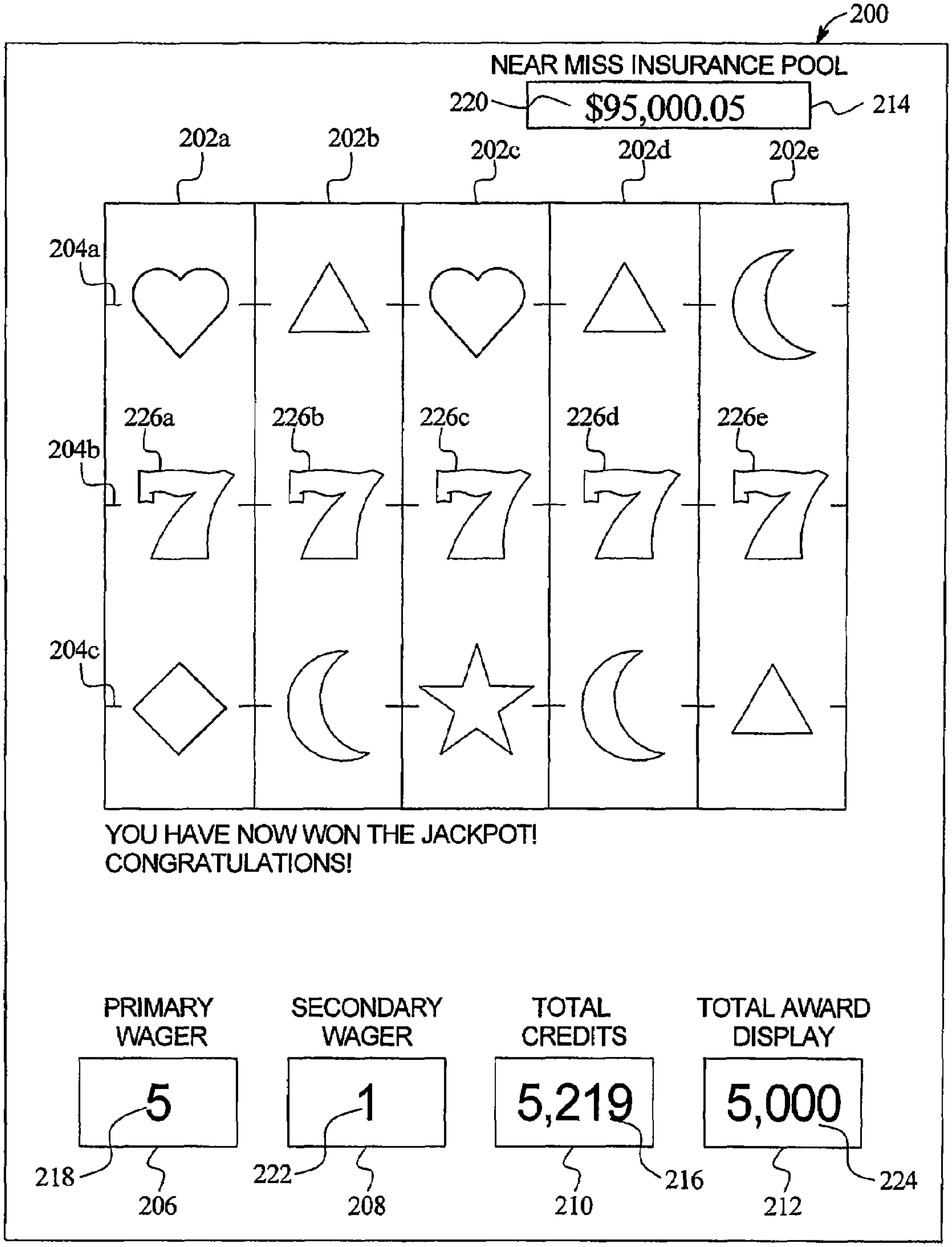

Referring to FIG. 6E, the gaming device provides an additional opportunity to obtain the designated outcome associated with the nearly missed outcome. In this example, the gaming device re-spins the fifth reel 202*e* (i.e., the reel containing the fifth symbol out of position) while holding the first four reels 202*a*, 202*b*, 202*c* and 202*d* stationary. However, it should be appreciated the one or more reels may be re-spun, and the reels may be spun any suitable number of times.

In this example, the reels are re-spun once and a fifth seven is generated on the fifth reel 202*e*. The generated outcome is the designated outcome and the gaming device provides the player with an award 224 of five-thousand, as indicated in the total award display 212. The gaming device updates the total credits 216 to five-thousand two-hundred nineteen, as indicated in the total credits display 210. The gaming device provides the award from or the award is funded by the near miss insurance pool 220, as indicated by the near miss insurance pool display 214. The game sequence ends.

It should be appreciated that the near miss award may be determined in any suitable manner. In one embodiment as described above, the gaming device provides a near miss award to the player if the designated outcome is generated as a result of the near miss additional opportunity. In this embodiment, the near miss insurance pool funds the near miss award and is a small percentage of the award associated with the designated outcome. In this embodiment, the near miss insurance is not sufficiently funded to be able to provide the top award or a linked progressive award. In another embodiment, the value of the near miss award is the same value associated with the designated outcome. In another embodiment, the value of the near miss award is the value associated with the designated outcome less the value of any first award received. That is, the total award for a play of the game cannot exceed the value associated with the particular designated outcome. Therefore, the player would receive a higher award if the designated outcome was generated on the first try and the near miss insurance pool operates more as a consolation prize.

Figure 7:
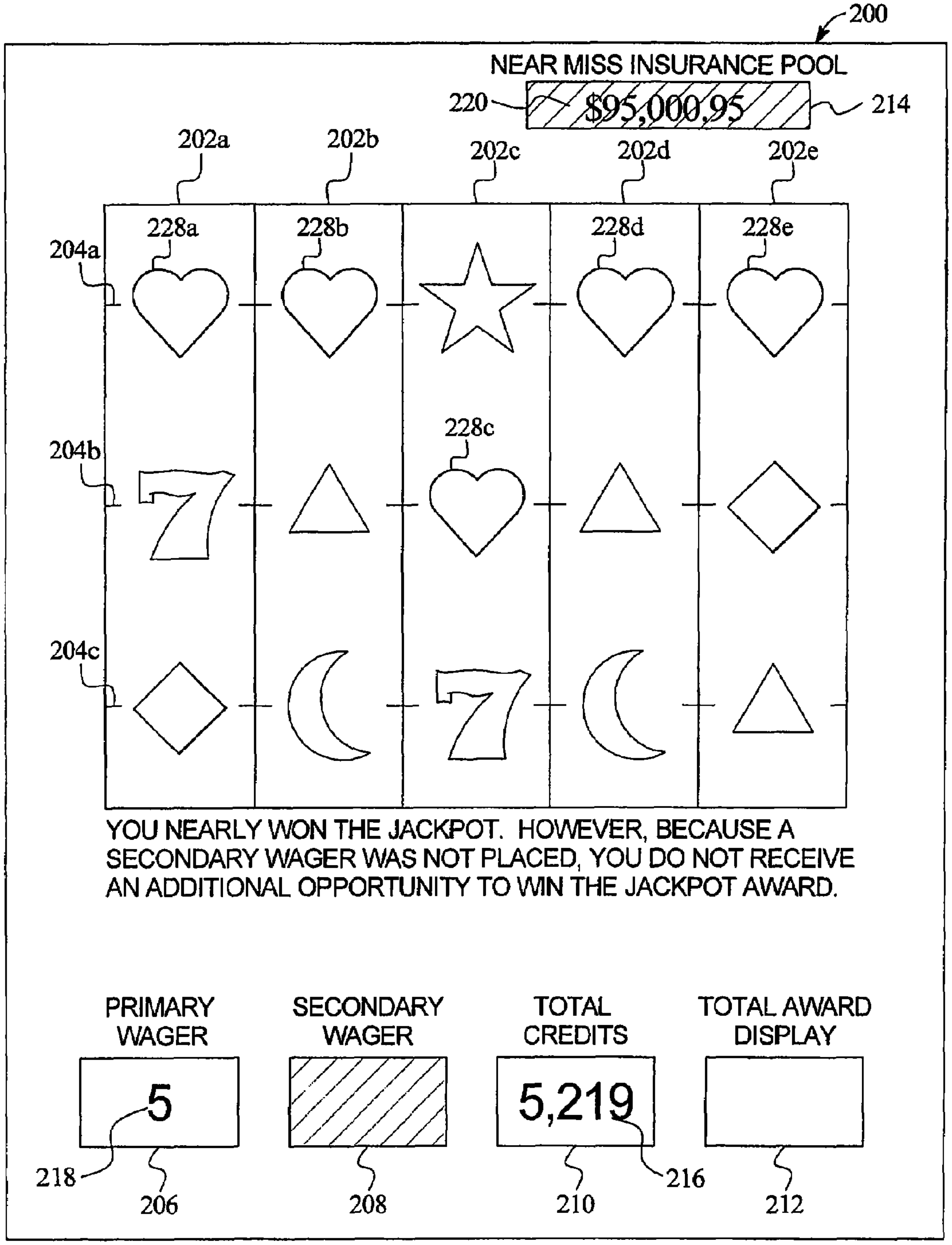
FIG. 7 is an elevation view of a display device showing an embodiment of the present invention where the player has chosen not to place an optional secondary wager.

Referring to FIG. 7, in one example of the embodiment described in reference to FIGS. 5A to 5E, the player does not make a secondary wager, as indicated by the secondary wager display 208. In this sequence of game play, the player makes a wager 218, as indicated in the primary wager display 206 and the player's total credits decrease to five-thousand two-hundred nineteen, as indicated by the total credits display 210. The gaming device generates an outcome. In this example, the generated outcome includes four hearts 228*a*, 228*b*, 228*d* and 228*e* occurring on the same payline 204*a*. However, in this embodiment, this combination of symbols is not associated with an award because the four hearts do not occur on the first four reels. Therefore, the player does not receive an award as indicated by the total award display 212. In this example, the designated outcome is five hearts occurring on the same payline. The generated outcome is one of the nearly missed outcomes associated with the designated outcome because four hearts occur on four reels 202*a*, 202*b*, 202*d* and 202*e* of the same payline 204*a* and a fifth heart 228*c* occurs on the fifth reel 202*c* of a different payline 204*c*. Therefore, the player has nearly missed the designated outcome. However, in this embodiment, because the player did not make a secondary wager, the player is not eligible to receive the award associated with the designated outcome, as indicated by the deactivated near miss insurance pool display 214. The player's total credits 216 remain at five-thousand two-hundred fourteen, as indicated by the total credits display 210.

Payline Modification

Figure 8A:
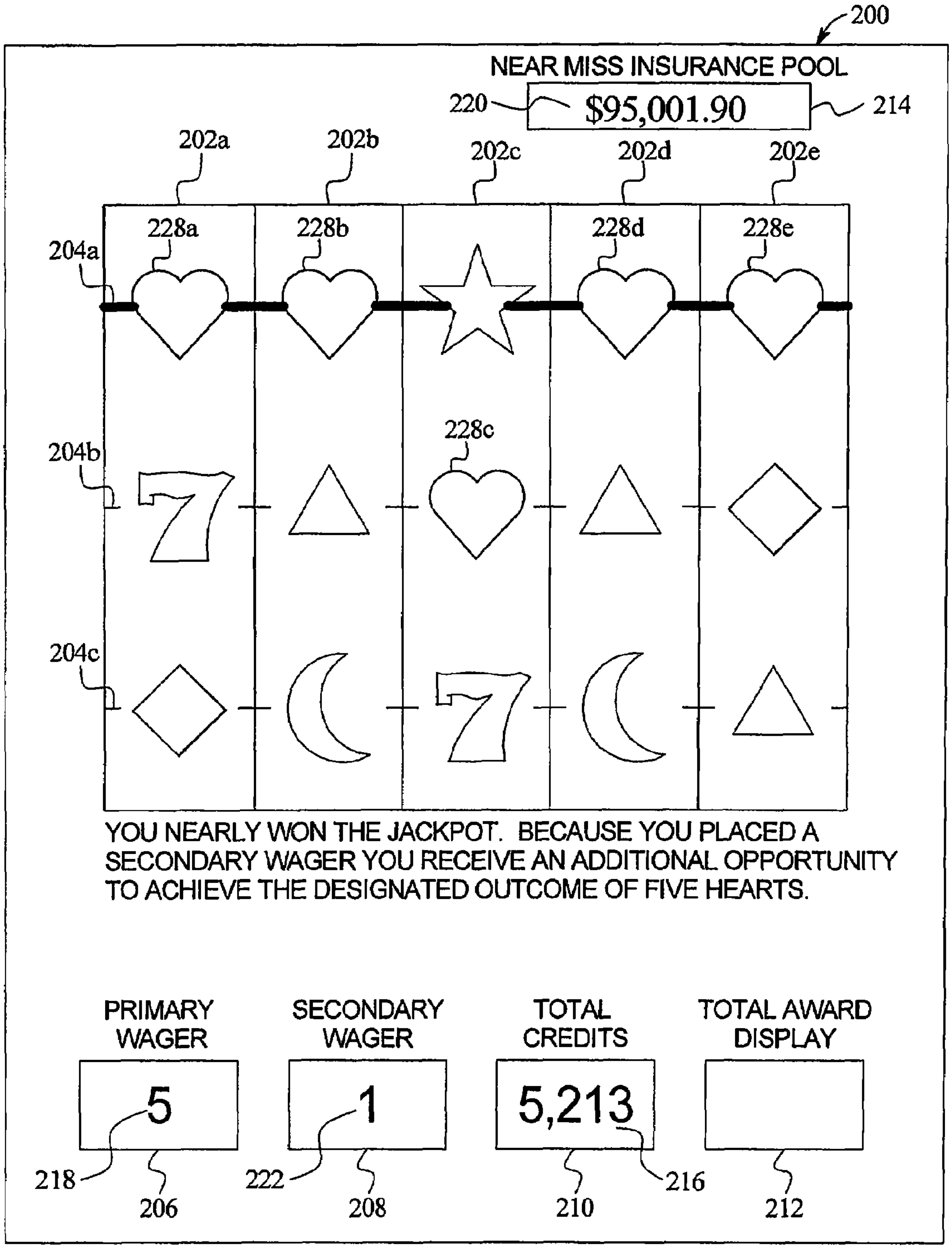
FIGS. 8A and 8B are elevation views of a display device showing one embodiment of the present invention wherein the payline is modified to achieve a designated outcome.

FIG. 8A illustrates an embodiment of the present invention that is played at a traditional slot machine, where the additional opportunity to obtain the designated outcome involves modifying the payline. In this sequence of game play, the player places the primary wager 218, as indicated in the primary wager display 206. The player also places the optional secondary wager 222, as indicated by the secondary wager display 208. In this embodiment, the gaming device allocates a portion of the secondary wager 222 into the near miss insurance pool 220, as indicated by the near miss insurance pool display 214. The gaming device generates an outcome on the display. In this example, the generated outcome includes four hearts 228*a*, 228*b*, 228*d* and 228*e* occurring on the same payline 204*a*. However, in one embodiment, this combination of symbols is not associated with an award because the four hearts do not occur on the first four reels. Therefore, the player does not receive an award as indicated by the total award display 212. In this example, the designated outcome is five hearts occurring on the same payline. The generated outcome is one of the nearly missed outcomes associated with the designated outcome because four hearts occur on four reels 202*a*, 202*b*, 202*d* and 202*e* of the same payline 204*a* and a fifth heart 228*c* occurs on the fifth reel 202*c* of a different payline 204*c*. Therefore, the player has nearly missed achieving the designated outcome.

Figure 8B:
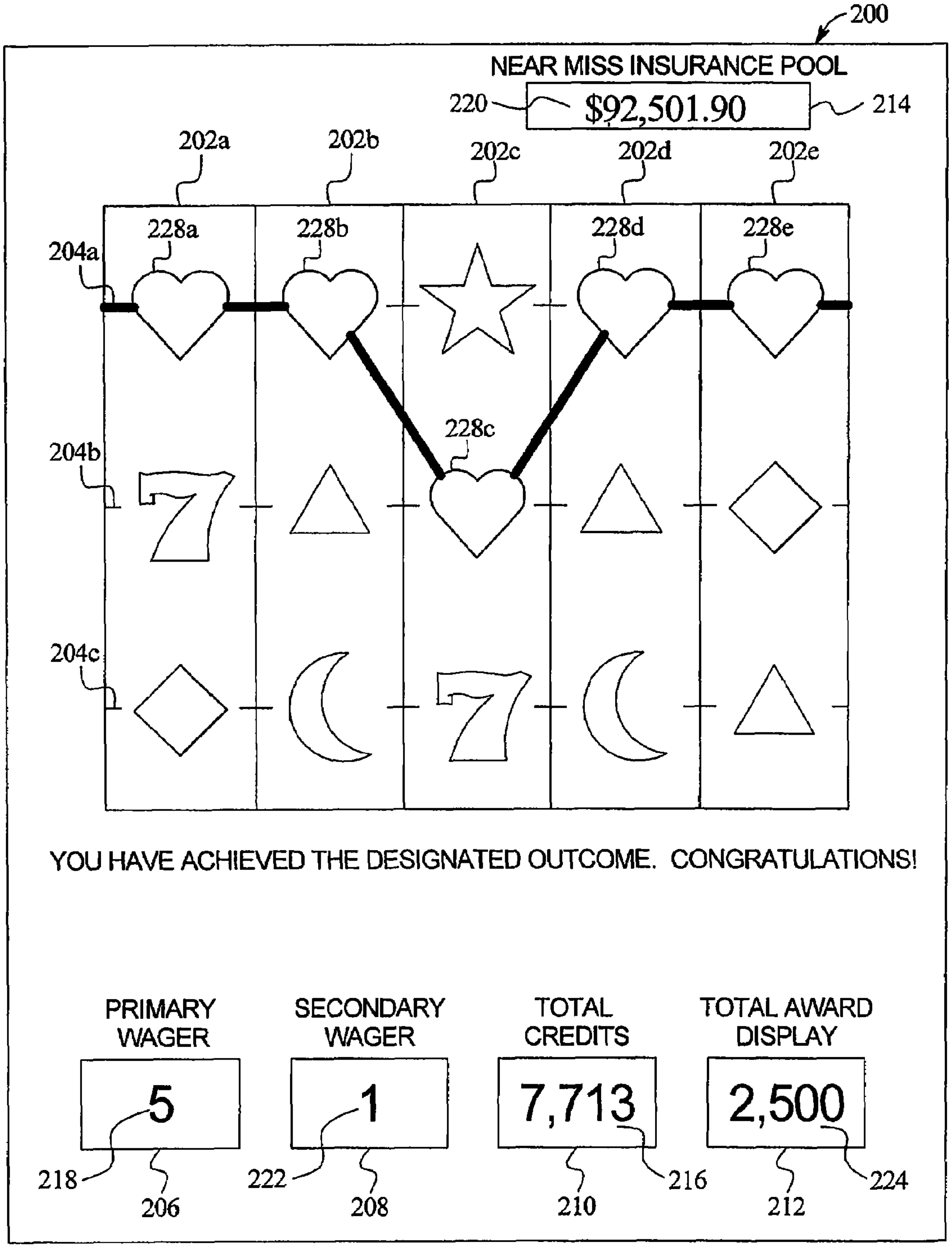

Referring to FIG. 8B, in one embodiment, the gaming device provides the player with an additional opportunity to achieve the designated outcome by modifying the shape of the payline 204*a* associated with the nearly missed outcome. In this embodiment, the reels are held stationary and payline is randomly, or through a predetermined method or order, skewed, changed or modified to include at least one other symbol from a different payline or symbol position not on the original payline. In this example, the payline in modified so as to include a symbol 228*c* from the third reel 202*c* and the middle horizontal payline 204*b*. The generated outcome is the designated outcome and the gaming provides the player with an award 224 of two-thousand five-hundred, as indicated in the total award display 212. The gaming device updates the total credits 216 to seven-thousand seven-hundred thirteen, as indicated in the total credits display 210. The gaming device provides the award from the near miss insurance pool 220, as indicated by the near miss insurance pool display 214. The game sequence ends. In another embodiment, the secondary wager is a direct purchase of one or more modifications of the payline after the generation of a nearly missed outcome. In this embodiment, all or a part of this purchase price would be allocated to the near miss insurance pool. Therefore, the player would only make the secondary wager after it has been determined that they have a near miss condition.

Funding of the Near Miss Insurance Pool

In one embodiment, the near miss insurance pool is associated with a single gaming machine. In one such embodiment, the near miss insurance pool is at least partially financed by taking a percentage contribution from all wagers. In one embodiment, if the player achieves a nearly missed outcome, the gaming device provides the player with an award funded by the near miss insurance pool. Therefore, the player is able to recoup amounts that the player personally contributed to the near miss insurance pool of a particular gaming machine. In one embodiment, the gaming device includes a display that indicates how much the player has contributed to the insurance pool. In this embodiment, as the near miss insurance pool becomes large, the player will be motivated to continue playing the game until a near miss outcome is generated.

In one embodiment, after the gaming machine provides the player with an award funded from the near miss insurance pool, if the value of the insurance pool falls below a certain minimum amount or base level the gaming machine resets the insurance pool to the base level. Therefore, this guaranteed base level amount in the near miss insurance pool increases player interest by having a minimum amount to draw an award from if the player achieves another near miss outcome.

In another embodiment, the near miss insurance pool is associated with a particular player though a player tracking system. In one embodiment, the player tracking system will retain the value of the player's personal near miss insurance pool either permanently or for a limited amount of time. In one embodiment, a player tracking card, as discussed above, allows the casino to associate a particular player identification number with an individual near miss insurance pool.

In one embodiment, the personal near miss insurance pool is at least partially financed by taking a percentage contribution from all wagers. In another embodiment, the player tracking system tracks the number of wagers made by a player and the value of near miss insurance pool is a function of the total number of plays. In one example, the value of the near miss insurance pool increases proportionately with the number of plays. However, it should be appreciated that the near miss insurance pool may be further increased in any suitable manner when a player achieves a particular level and/or frequency of play.

In one embodiment, the player's personal near miss insurance pool applies to several different gaming machines and/or different types of table games. In this embodiment, the tracking system retains a record of the player's near miss insurance pool from a plurality of different gaming machines or table games. Therefore, the player is free to take a break or switch to a different gaming machine or table game and not lose the potential value accumulated in their personal near miss insurance pool. In one embodiment, the tracking system will retain the player's near miss insurance pool until they physically leave the casino or until a specified amount of time occurs between successive plays. Therefore, the player is motivated to continue playing until they are able to recoup amounts accumulated in or personally funded to the near miss insurance pool.

In one embodiment, the player must wager a minimum number of credits to become eligible for the near miss award. The minimum number of credits required is adjusted to an optimum value by the casino operator. In another embodiment, the player is eligible for the near miss award only if they play the maximum number of credits. The main advantage of this method is that it serves to increase the average wager placed at a gaming machine. In one embodiment, only a percentage of the eligible wagers will be contributed to the near miss insurance pool. The main disadvantage of this method is that money will only accrue into the insurance pool through wagers that meet the minimum eligibility amount. Any wagers not meeting or exceeding this amount will not contribute towards the near miss insurance pool.

In another embodiment, the near miss insurance pool is funded through contributions from a plurality of gaming machines that are linked together through a network. In this embodiment, these individual gaming machines may be physically grouped together as in a bank of machines or may be scattered around the gaming establishment.

In one embodiment, there is a separate near miss insurance pool for each particular game. For example, a standard video poker game has a near miss insurance pool and a variation of video poker such as deuces wild has a different near miss insurance pool.

In another embodiment, there is a near miss insurance pool for each particular type of game. For example, all variations of video poker games have a collective near miss insurance pool, and all variations of slot games have another collective near miss insurance pool.

In another embodiment, different near miss insurance pools are provided for different wagering denominations. For example, nickel games would have a near miss insurance pool and dollar games would have a separate near miss insurance pool.

In another embodiment a single near miss insurance pool is funded by every gaming device in a gaming establishment including slot machines, poker, keno, and other games. In this embodiment, a percentage of each wager or qualifying wager is applied to the near miss insurance pool. In one embodiment, the near award associated with achieving a nearly missed outcome may be related to the amount wagered.

In one embodiment, the near miss insurance pool is funded by the gaming establishment through a promotion. In this embodiment, the gaming establishment contributes a base amount to the near miss insurance pool that is provided from a separate source. In one embodiment, every player is eligible for the near miss insurance pool without having to contribute a portion of each wager or having to place an optional secondary wager (as discussed above in reference to FIG. 5). In another embodiment, players that have achieved a particular level of play according to the player tracking system are eligible for the near miss insurance pool funded by the promotion. In these embodiments, the players do not fund the insurance pool directly. In another embodiment, the near miss insurance pool is funded by contributions from each wager and the insurance pool may be supplemented by the gaming establishment through a promotion.

In one embodiment, the near miss insurance pool is funded through a one time payment from a single player on a single gaming machine. In this embodiment, the player's single payment would qualify that player for the near miss insurance pool for a given period of time or for a given number of plays. In one embodiment, a player tracking card stores information related to the player's single payment such that the player can play on different gaming machines. It should be appreciated that the funding of the near miss insurance pool can be accomplished in any suitable manner.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, said gaming device comprising:

a display device controlled by the processor;

a game controlled by the processor and adapted to be displayed by the display device, said game operable upon a wager by a player;

a plurality of different outcomes in the game, the outcomes including:

(a) a plurality of winning outcomes, each winning outcome associated with one of a plurality of awards, one of the awards provided to the player for each winning outcome, (b) a plurality of losing outcomes, (c) at least one designated outcome that includes a predetermined number of symbols arranged in predetermined positions, and (d) at least one near miss outcome associated with said designated outcome, wherein the near miss outcome includes all but one of the symbols of the designated outcome arranged in the predetermined positions necessary to form the designated outcome;

a designated award provided to the player according to a paytable if a play of the game results in the designated outcome; and a near miss award provided to the player if the play of the game generates the near miss outcome, wherein at least a portion of the near miss award is provided by or funded by a near miss insurance pool associated with the near miss outcome and is independent from the paytable.

2. The gaming device of claim 1, wherein the symbol not in the predetermined position necessary to form the designated outcome is one position away from said predetermined position.

3. The gaming device of claim 1, wherein the designated outcome includes at least three symbols arranged in the predetermined positions.

4. The gaming device of claim 1, wherein the near miss insurance pool is funded at least in part from a portion of the wagers on plays of the game.

5. The gaming device of claim 1, wherein the near miss insurance pool is funded at least in part by a portion of the wagers on a plurality of gaming devices linked through a network.

6. The gaming device of claim 1, wherein the near miss insurance pool is funded at least in part by a gaming establishment.

7. The gaming device of claim 1, wherein the near miss award is a quantity of free plays of the game, said quantity being at least one.

8. The gaming device of claim 1, wherein the near miss award is an award of credits.

9. The gaming device of claim 1, wherein the near miss award is at least one additional opportunity to obtain the designated outcome in the game, wherein the processor provides an award of credits if the gaming device generates the designated outcome from the additional opportunity.

10. The gaming device of claim 9, wherein the game includes a plurality of reels, and the additional opportunity includes re-spinning the reel having the symbol not in the predetermined position.

11. The gaming device of claim 9, wherein the game includes at least one payline occurring across a plurality of reels, and the additional opportunity includes modifying the shape of the payline to occur across at least one different reel position on the reel having the symbol not in the predetermined position.

12. The gaming device of claim 9, which includes an option for the player to exchange the additional opportunity for a consolation award, wherein the value of the consolation award is less than the value of the award associated with the designated outcome.

13. The gaming device of claim 1, wherein the symbols include a suit and a rank, and wherein the near miss outcome further includes one of said symbols in one of the predetermined positions having an incorrect suit.

14. The gaming device of claim 1, wherein the symbols include a suit and a rank, and wherein the near miss outcome further includes one of said symbols in one of the predetermined positions having an incorrect rank.

15. The gaming device of claim 1, wherein the symbols include a suit and a rank, and wherein the near miss outcome further includes one of said symbols in one of the predetermined positions having an incorrect suit or an incorrect rank.

16. The gaming device of claim 1, wherein the designated outcome includes a first plurality of symbols arranged in the predetermined positions, the near miss outcome includes a second plurality of symbols arranged in the predetermined positions, wherein one of the symbols in the second plurality of symbols is different from one of the symbols in the first plurality of symbols.

17. The gaming device of claim 16, wherein the game is a video based poker game.

18. The gaming device of claim 16, wherein the first plurality of symbols are player determined and the second plurality of symbols are randomly determined by the processor.

19. The gaming device of claim 18, wherein the game is a keno game.

20. The gaming device of claim 1, which includes a plurality of reels each having a plurality of stop positions, at least one payline across said reels, and a plurality of symbols generated on said reels, the designated outcome including a first plurality of symbols generated on the payline.

21. The gaming device of claim 20, wherein the near miss outcome is a plurality of symbols located at a plurality of positions on the reels where one of said symbols is located in an incorrect position, said incorrect position being at least one reel stop position away from the payline.

22. A gaming device operable under control of a processor, said gaming device comprising:

a game controlled by the processor and adapted to be displayed by the display device, said game operable upon a wager by a player;

a plurality of different outcomes in the game, the outcomes including:

(a) a plurality of winning outcomes, each winning outcome associated with one of a plurality of awards, one of the awards provided to the player for each winning outcome, (b) a plurality of losing outcomes, (c) at least one designated outcome that includes a predetermined number of symbols arranged in predetermined positions, and (d) least one near miss outcome associated with said designated outcome, wherein the near miss outcome includes all but one of the symbols of the designated outcome in the predetermined positions necessary to form the designated outcome;

an optional qualifying wager;

a designated award associated with a paytable; and a near miss award provided to the player, wherein at least a portion of the near miss award is provided by or funded by a near miss insurance pool associated with the near miss outcome and is independent from the paytable;

wherein the processor is operable with said display device to control a play of the game by:

(a) enabling the player to place the primary wager;

(b) enabling the player to place the optional qualifying wager;

(c) generating one of the plurality of outcomes;

(d) if the generated outcome is one of said designated outcomes, providing the player with the designated award according to the paytable; and (d) if the generated outcome is one of said near miss outcomes and if the player has placed the optional qualifying wager, providing the player with the near miss award.

23. The gaming device of claim 22, wherein the symbols include a suit and a rank, and wherein the near miss outcome further includes one of said symbols in the predetermined positions having an incorrect suit.

24. The gaming device of claim 22, wherein the symbols include a suit and a rank, and wherein the near miss outcome further includes one of said symbols in the predetermined positions having an incorrect rank.

25. The gaming device of claim 22, wherein the symbols include a suit and a rank, and wherein the near miss outcome further includes one of said symbols in the predetermined positions having an incorrect suit or an incorrect rank.

26. The gaming device of claim 22, wherein the designated outcome includes at least three symbols arranged in the predetermined positions.

27. The gaming device of claim 26, wherein the near miss insurance pool is funded at least in part from a portion of the wagers on plays of the game.

28. The gaming device of claim 22, wherein the near miss insurance pool is funded at least in part by a portion of the wagers on a plurality of gaming devices linked through a network.

29. The gaming device of claim 22, wherein the near miss insurance pool is funded at least in part by a gaming establishment.

30. The gaming device of claim 22, wherein the near miss insurance pool is funded at least in part by at least a portion of the optional qualifying wager.

31. The gaming device of claim 22, wherein the near miss award is an award of credits.

32. The gaming device of claim 22, wherein the near miss award is a quantity of free plays of the game, said quantity being at least one.

33. The gaming device of claim 22, wherein the near miss award is at least one additional opportunity to obtain the designated outcome in the game, wherein the processor provides an award of credits if the gaming device generates the designated outcome from the additional opportunity.

34. The gaming device of claim 33, wherein the game includes a plurality of reels and the additional opportunity to obtain the designated outcome includes re-spinning the reel having the symbol not in the predetermined position.

35. The gaming device of claim 33, wherein the game includes a payline associated with the plurality of symbols and the additional opportunity to obtain the designated outcome includes modifying the shape of the payline to include at least one other symbol not on the original payline.

36. The gaming device of claim 33, wherein the game includes at least one payline occurring across a plurality of reels, and the additional opportunity to obtain the designated outcome includes moving at least one of the symbols required for said designated outcome to a different stop position on the reel having the symbol not in the predetermined position.

37. The gaming device of claim 33, which includes an option for the player to directly purchase the additional opportunity, wherein the option is selected from the group consisting of: an option prior to the game; an option during the game; and an option at the end of the game.

38. The gaming device of claim 22, wherein the symbol not in the predetermined position necessary to form the designated outcome is one position away from said predetermined position.

39. A method of operating a gaming device, said method comprising:

enabling the player to place a wager;

generating one of a plurality of different outcomes, the outcomes including:

(a) a plurality of winning outcomes, each winning outcome associated with one of a plurality of awards, one of the awards provided to the player for each winning outcome, (b) a plurality of losing outcomes, (c) at least one designated outcome that includes a predetermined number of symbols arranged in predetermined positions, and (d) at least one near miss outcome associated with said designated outcome, wherein the near miss outcome includes all but one of the symbols of the designated outcome in the predetermined positions necessary to form the designated outcome;

providing the player with a designated award according to a paytable if a play of the game results in the designated outcome; and providing a near miss award to the player if the generated outcome is the near miss outcome, wherein at least a portion of the near miss award is provided by or funded by a near miss insurance pool associated with the near miss outcome and is independent from the paytable.

40. The gaming device of claim 39, wherein the symbol not in the predetermined position necessary to form the designated outcome is one position away from said predetermined position.

41. The method of claim 39, wherein the designated outcome includes at least three symbols arranged in the predetermined positions.

42. The method of claim 39, wherein the near miss insurance pool is funded at least in part from a portion of the wagers on a play the game.

43. The method of claim 39, wherein the near miss insurance pool is funded at least in part by a portion of wagers on a plurality of gaming devices linked through a network.

44. The method of claim 39, wherein the near miss insurance pool is funded at least in part by a gaming establishment.

45. The method of claim 39, wherein the near miss award is a quantity of free plays of the game, said quantity being at least one.

46. The method of claim 39, wherein the near miss award is an award of credits.

47. The method of claim 39, wherein the near miss award is at least one additional opportunity to obtain the designated outcome in the game, and includes providing an award of credits if the processor generates the designated outcome on the additional opportunity.

48. The method of claim 47, wherein the game includes a plurality of reels, and wherein the additional opportunity includes re-spinning the reel having the symbol not in the predetermined position.

49. The method of claim 47, including enabling the player to exchange the additional opportunity for a consolation award, wherein the value of the consolation award is less than the value of the award of credits associated with achieving the designated outcome.

50. The method of claim 39, wherein the symbols include a suit and a rank, and wherein the near miss outcome further includes one of said symbols in the predetermined positions having an incorrect suit.

51. The method of claim 39, wherein the symbols include a suit and a rank, and wherein the near miss outcome further includes one of said symbols in the predetermined positions having an incorrect rank.

52. The method of claim 39, wherein the symbols include a suit and a rank, and wherein the near miss outcome further includes one of said symbols in the predetermined positions having an incorrect suit or an incorrect rank.

53. The method of claim 39, wherein the designated outcome includes a first plurality of symbols, the near miss outcome includes a second plurality of symbols, wherein one of the symbols in the second plurality of symbols is different from one of the symbols in the first plurality of symbols.

54. The method of claim 53, including enabling the player to pick the first combination of symbols and randomly determining the second combination of symbols.

55. The method of claim 54, wherein the game is a keno game.

56. The method of claim 39, wherein the game includes a plurality of reels each having a plurality of stop positions, at least one payline occurring across said reels, and a plurality of symbols generated on said reels, the designated outcome including a first plurality of symbols generated on the payline.

57. The method of claim 56, wherein the near miss outcome is a plurality of symbols located at a plurality of positions on the reels where one of said symbols is located in an incorrect position, said incorrect position being at least one reel stop position away from the payline.

58. The method of claim 39, which is provided through a data network.

59. The method of claim 58, wherein the data network is an internet.

60. A method of operating a gaming device, said method comprising:

providing a game operable on a primary wager;

enabling the player to place an optional qualifying wager;

generating one of a plurality of outcomes, the outcomes including:

(a) a plurality of winning outcomes, each winning outcome associated with one of a plurality of awards, one of the awards provided to the player for each winning outcome, (b) a plurality of losing outcomes, (c) at least one designated outcome that includes a predetermined number of symbols arranged in predetermined positions, and (d) at least one near miss outcome associated with said designated outcome, wherein the near miss outcome includes all but one of the symbols of the designated outcome in the predetermined positions necessary to form the designated outcome;

providing the player with a designated award according to a paytable if the designated outcome is generated; and providing a near miss award to the player if the generated outcome is the near miss outcome and if the player has placed the optional qualifying wager, wherein at least a portion of the near miss award is provided by or funded by a near miss insurance pool associated with the near miss outcome and is independent from the paytable.

61. The method of claim 60, wherein the symbols include a suit and a rank, and wherein the near miss outcome further includes one of said symbols in the predetermined positions having an incorrect suit.

62. The method of claim 60, wherein the symbols include a suit and a rank, and wherein the near miss outcome further includes one of said symbols in the predetermined positions having an incorrect rank.

63. The method of claim 60, wherein the symbols include a suit and a rank, and wherein the near miss outcome further includes one of said symbols in the predetermined positions having an incorrect suit or an incorrect rank.

64. The method of claim 60, wherein the designated outcome includes at least three symbols arranged in the predetermined positions.

65. The method of claim 60, wherein the symbol not in the predetermined position necessary to form the designated outcome is one position away from said predetermined position.

66. The method of claim 60, which includes funding the near miss insurance pool, at least in part, from a portion of wagers on plays of said game.

67. The method of claim 60, which includes funding the near miss insurance pool, at least in part, by a portion of every wager on a plurality of gaming devices linked through a network.

68. The method of claim 60, which includes funding the near miss insurance pool, at least in part, by a gaming establishment.

69. The method of claim 60, which includes funding the near miss insurance pool, at least in part, by at least a portion of an optional qualifying wager.

70. The method of claim 60, wherein the near miss award is an award of credits.

71. The method of claim 60, wherein the near miss award is a quantity of free plays of the game, said quantity being at least one.

72. The method of claim 60, wherein the near miss award is at least one additional opportunity to obtain the designated outcome in the game, and providing a monetary award if the game generates the designated outcome on said additional opportunity.

73. The method of claim 72, wherein the game includes a plurality of reels, and wherein the additional opportunity includes re-spinning the reel having the symbol not in the predetermined position.

74. The method of claim 72, including a payline associated with the plurality of symbols and the additional opportunity to obtain the designated outcome includes modifying the shape of the payline to include at least one other symbol.

75. The method of claim 72, including a plurality of symbols on a plurality of reels and a payline associated with the plurality of symbols, and the additional opportunity to obtain the designated outcome includes moving at least one of the symbols required for said designated outcome to a different stop position on the reel.

76. The method of claim 72, including providing the player with an option to directly purchase the additional opportunity, wherein the option is selected from the group consisting of: an option prior to the game; an option during the game; and an option at the end of the game.

77. The method of claim 60, which is provided through a data network.

78. The method of claim 77, wherein the data network is an internet.

* * * * *

UNITED STATES PATENT AND TRADEMARK OFFICE
CERTIFICATE OF CORRECTION

PATENT NO. : 7,585,222 B2
APPLICATION NO. : 11/427656
DATED : September 8, 2009
INVENTOR(S) : Muir It is certified that error appears in the above-identified patent and that said Letters Patent is hereby corrected as shown below:

IN THE CLAIMS:

In Claim 11, Column 31, line 55, replace "the", second occurrence, with --a--.

In Claim 11, Column 31, line 56, insert --at least one-- after "the".

In Claim 35, Column 33, line 51, replace "the" with --a--.

In Claim 40, Column 34, line 28, replace "gaming device" with --method--.

In Claim 74, Column 36, line 44, replace "the", second occurrence, with --a--.

Signed and Sealed this

Twenty-fourth Day of August, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,585,222 B2
APPLICATION NO. : 11/427656
DATED : September 8, 2009
INVENTOR(S) : David H. Muir It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Fourteenth Day of September, 2010

David J. Kappos

*Director of the United States Patent and Trademark Office*